US011380177B2

(12) United States Patent
Kinoshita et al.

(10) Patent No.: US 11,380,177 B2
(45) **Date of Patent: *Jul. 5, 2022**

(54) MONITORING CAMERA AND DETECTION METHOD

(71) Applicant: PANASONIC I-PRO SENSING SOLUTIONS CO., LTD., Fukuoka (JP)

(72) Inventors: Hidetoshi Kinoshita, Fukuoka (JP); Toshihiko Yamahata, Fukuoka (JP); Takamitsu Arai, Fukuoka (JP); Ryo Kubota, Fukuoka (JP)

(73) Assignee: PANASONIC I-PRO SENSING SOLUTIONS CO., LTD., Fukuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/162,756

(22) Filed: Jan. 29, 2021

(65) Prior Publication Data

US 2021/0150868 A1 May 20, 2021

Related U.S. Application Data

(63) Continuation of application No. 16/743,403, filed on Jan. 15, 2020, now Pat. No. 10,950,104.

(30) Foreign Application Priority Data

Jan. 16, 2019 (JP) ............................. JP2019-005279
Sep. 10, 2019 (JP) ............................. JP2019-164739

(51) Int. Cl.
*G06T 7/246* (2017.01)
*G06T 15/20* (2011.01)
(Continued)

(52) U.S. Cl.
CPC . *G08B 13/19695* (2013.01); *G08B 13/19697* (2013.01); *G08B 13/19602* (2013.01); *G08B 13/19678* (2013.01)

(58) Field of Classification Search
None
See application file for complete search history.

(56) References Cited

U.S. PATENT DOCUMENTS 6,970,576 B1 11/2005 Tilsley
8,081,817 B2 * 12/2011 Tedesco .............. G06F 16/5838 382/159
(Continued)

FOREIGN PATENT DOCUMENTS

JP 2011-055262 A 3/2011
JP 2016-157219 A 9/2016
(Continued)

OTHER PUBLICATIONS

Decision to Grant a Patent issued in Japanese family member Patent Appl. No. 2019-005279, dated Jul. 9, 2020, along with an English translation thereof.

*Primary Examiner* — Mohammad J Rahman
(74) *Attorney, Agent, or Firm* — Greenblum & Bernstein, P.L.C.

(57) ABSTRACT

A monitoring camera having artificial intelligence includes an imaging unit, a communication unit that receives a parameter relating to a detection target from a terminal device, and a processing unit that constructs the artificial intelligence based on the parameter, and uses the constructed artificial intelligence to detect the detection target from an image captured by the imaging unit.

8 Claims, 30 Drawing Sheets

(51) Int. Cl.
*G06T 19/00* (2011.01)
*G08B 13/196* (2006.01)

(56) References Cited

U.S. PATENT DOCUMENTS

| | | | | |
|---|---|---|---|---|
| 9,091,904 | B2 | 7/2015 | Yamahata et al. | |
| 9,811,818 | B1 * | 11/2017 | Xing | G06Q 30/0226 |
| 10,212,778 | B1 | 2/2019 | Fu | |
| 10,275,657 | B2 | 4/2019 | Hisada et al. | |
| 10,275,688 | B2 | 4/2019 | Jiang | |
| 10,366,482 | B2 | 7/2019 | Greenway, Jr. et al. | |
| 2007/0154066 | A1 * | 7/2007 | Lin | G06T 7/262 382/103 |
| 2007/0200701 | A1 | 8/2007 | English | |
| 2015/0221194 | A1 | 8/2015 | Sarkar | |
| 2017/0134631 | A1 * | 5/2017 | Zhao | G06V 20/17 |
| 2018/0196261 | A1 * | 7/2018 | Schickel | G02B 27/0101 |
| 2018/0204381 | A1 | 7/2018 | Kanatsu | |
| 2018/0349686 | A1 * | 12/2018 | Bai | A61B 5/7264 |
| 2019/0088097 | A1 | 3/2019 | Jacobs | |
| 2019/0268572 | A1 | 8/2019 | Tsukahara et al. | |
| 2019/0311201 | A1 * | 10/2019 | Selinger | G06K 9/00744 |
| 2019/0313024 | A1 * | 10/2019 | Selinger | H04N 5/23206 |
| 2019/0392588 | A1 | 12/2019 | Far | |
| 2020/0045416 | A1 | 2/2020 | Kamio et al. | |
| 2020/0097734 | A1 | 3/2020 | Miyake et al. | |
| 2020/0160601 | A1 * | 5/2020 | Shreve | G06K 9/00671 |
| 2020/0219234 | A1 | 7/2020 | Sotodate | |
| 2020/0226898 | A1 | 7/2020 | Kinoshita | |
| 2020/0244926 | A1 | 7/2020 | Kinoshita | |

FOREIGN PATENT DOCUMENTS

| | | |
|---|---|---|
| JP | 2017-538999 A | 12/2017 |
| KR | 10-1553000 B1 | 9/2015 |
| WO | WO2016/199192 | 12/2016 |
| WO | WO2014/208575 | 2/2017 |

* cited by examiner

MONITORING CAMERA AND DETECTION METHOD

CROSS REFERENCE TO RELATED APPLICATIONS

The present application is a continuation of U.S. patent application Ser. No. 16/743,403, filed Jan. 15, 2020, which claims the benefit of Japanese Patent Application No. 2019-164739, filed Sep. 10, 2019, and Japanese Patent Application No. 2019-005279, filed Jan. 16, 2019. The disclosure of each of the above-identified applications is expressly incorporated herein by reference in its entirety.

BACKGROUND OF THE INVENTION

1. Field of the Invention

The present disclosure relates to a monitoring camera and a detection method.

2. Background Art

International Publication No. 2016/199192 discloses a mobile remote monitoring camera including artificial intelligence. The mobile remote monitoring camera of International Publication No. 2016/199192 is a monitoring camera of an all-in-one structure in which a web camera, a router, artificial intelligence, and the like are housed in a case.

A detection target detected by a monitoring camera may differ depending on a user who uses the monitoring camera. For example, a certain user detects a man by using the monitoring camera. Another user detects a vehicle by using the monitoring camera. Further, still another user detects a harmful animal by using the monitoring camera.

However, International Publication No. 2016/199192 does not disclose a specific method for setting a detection target that the user wants to detect to the monitoring camera.

SUMMARY OF THE INVENTION

A non-limiting example of the present disclosure contributes to provision of a monitoring camera and a detection method that can flexibly set a detection target that the user wants to detect to a monitoring camera.

The present disclosure provides a monitoring camera that includes artificial intelligence and that includes a sound collection unit, a communication unit that receives a parameter for teaching an event of a detection target, and a processing unit that constructs the artificial intelligence based on the parameter and uses the constructed artificial intelligence to detect the event of the detection target from a voice collected by the sound collection unit.

Further, the present disclosure provides a monitoring camera that includes artificial intelligence and that includes at least one sensor, a communication unit that receives a parameter for teaching an event of a detection target, and a processing unit that constructs the artificial intelligence based on the parameter and uses the constructed artificial intelligence to detect the event of the detection target from measurement data measured by the sensor.

Further, the present disclosure provides a detection method of a monitoring camera having artificial intelligence, which includes receiving a parameter for teaching an event of a detection target, constructing the artificial intelligence based on the parameter, and using the artificial intelligence to detect the event of the detection target from a voice collected by a microphone.

Further, the present disclosure provides a detection method of a monitoring camera having artificial intelligence, which includes receiving a parameter for teaching an event of a detection target, constructing the artificial intelligence based on the parameter, and using the artificial intelligence to detect the event of the detection target from measurement data measured by a sensor.

The comprehensive or specific aspect may be realized by a system, a device, a method, an integrated circuit, a computer program, or a recording medium and may be realized by any combination of the system, the device, the method, the integrated circuit, the computer program, and the recording medium.

According to one aspect of the present disclosure, a detection target that a user wants to detect can be flexibly set to a monitoring camera.

Further advantages and effects of one aspect of the present disclosure will become apparent from the specification and drawings. The advantages and/or effects are provided by some embodiments and features described in the specification and drawings, respectively, but not all need to be provided to obtain one or more identical features.

DETAILED DESCRIPTION OF THE EXEMPLARY EMBODIMENT

Hereinafter, embodiments that specifically disclose a configuration and an operation of a monitoring camera according to the present disclosure will be described in detail with reference to the drawings as appropriate. However, more detailed description than necessary may be omitted. For example, detailed description on well-known matters and repeated description on substantially the same configuration may be omitted. This is to avoid the following description from becoming unnecessarily redundant and to facilitate understanding by those skilled in the art. The accompanying drawings and the following description are provided to enable those skilled in the art to fully understand the present disclosure and are not intended to limit a subject matter described in the claims.

First Embodiment

Figure 1:
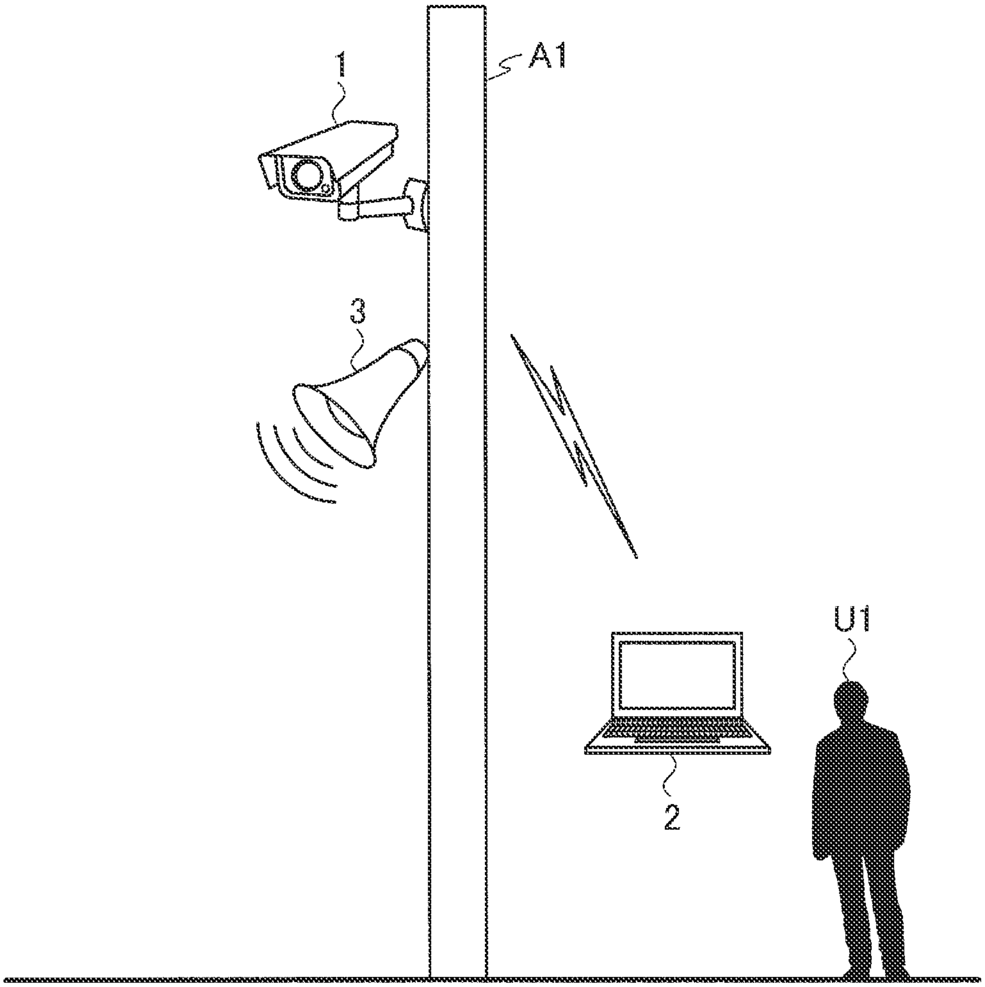
FIG. 1 is a diagram illustrating an example of a monitoring camera system according to a first embodiment.

FIG. 1 is a diagram illustrating an example of a monitoring camera system according to a first embodiment. As illustrated in FIG. 1, the monitoring camera system includes a monitoring camera 1, a terminal device 2, and an alarm device 3.

In FIG. 1, in addition to the monitoring camera system, a part of a structure A1 and a user U1 who uses the terminal device 2 are illustrated. The structure A1 is, for example, an outer wall or an inner wall of a building. Alternatively, the structure A1 is a pillar or the like which is installed in a field or the like. The user U1 may be a purchaser who purchases the monitoring camera 1. Further, the user UT may be a builder or the like who installs the monitoring camera 1 on the structure A1.

For example, the monitoring camera 1 is installed in the structure A1 and images surroundings of the structure A1. The monitoring camera 1 mounts artificial intelligence therein and detects a detection target (predetermined image) from an image to be captured by using the mounted artificial intelligence. Hereinafter, the artificial intelligence may be simply referred to as an A1.

The detection target includes, for example, human detection (distinction as to whether or not it is a man). Further, the detection target includes, for example, detection of a specific man (face authentication). Further, the detection target includes, for example, detection of a vehicle such as a bicycle, an automobile, and a motorcycle (distinction as to whether or not it is a vehicle). Further, the detection target includes, for example, detection of a vehicle type of the automobile or a vehicle type of the motorcycle. Further, the detection target includes, for example, detection of an animal (distinction as to whether or not it is an animal). Further, the detection target includes, for example, detection of an animal type such as a bear, a raccoon dog, a deer, a horse, a cat, a dog, and a crow. Further, the detection target includes, for example, detection of an insect (distinction as to whether or not it is an insect), Further, the detection target includes, for example, detection of an insect type such as a wasp, a butterfly, and a caterpillar. Further, the detection target includes, for example, detection of inflorescence of a flower.

The user U1 can set the detection target of the monitoring camera 1 by using the terminal device 2. For example, it is assumed that the user U1 wants to detect an automobile parked in a parking lot by using the monitoring camera 1. In this case, the user U1 installs the monitoring camera 1 at a place where the parking lot can be imaged and uses the terminal device 2 to set the detection target of the monitoring camera 1 to the automobile. Further, for example, it is assumed that the user U1 uses the monitoring camera 1 to detect a boar appearing in the field. In this case, the user U1 installs the monitoring camera 1 at a place where the field can be imaged and uses the terminal device 2 to set the detection target of the monitoring camera 1 to the boar.

The monitoring camera 1 notifies the detection result to one or both of the terminal device 2 and the alarm device 3. For example, if the monitoring camera 1 detects an automobile from an image of imaging a parking lot, the monitoring camera 1 transmits information indicating that the automobile is detected to the terminal device 2. Further, for example, if the monitoring camera 1 detects a boar from an image of imaging a field, the monitoring camera 1 transmits information indicating that the boar is detected to the alarm device 3.

The terminal device 2 is an information processing device such as a personal computer, a smartphone, or a tablet terminal. The terminal device 2 communicates with the monitoring camera 1 by wire or wireless.

The terminal device 2 is owned by, for example, the user U1. The terminal device 2 sets the detection target of the monitoring camera 1 according to an operation of the user U1. Further, the terminal device 2 receives a detection result of the monitoring camera 1. The terminal device 2 displays, for example, the detection result on a display device, or outputs the detection result by voice by using a speaker or the like.

For example, the alarm device 3 is installed in the structure A1 in which the monitoring camera 1 is installed. The alarm device 3 may be installed in a structure different from the structure A1 in which the monitoring camera 1 is installed. The alarm device 3 communicates with the monitoring camera 1 by wire or wireless.

The alarm device 3 is, for example, a speaker. For example, the alarm device 3 outputs a voice according to the detection result notified from the monitoring camera 1. For example, when the alarm device 3 receives information indicating that a boar is detected from the monitoring camera 1, the alarm device 3 emits a sound for expelling the boar from the field.

The alarm device 3 is not limited to the speaker. The alarm device 3 may be, for example, a floodlight projector or the like. For example, when the monitoring camera 1 detects an intruder, the alarm device 3 (floodlight projector) may emit light to warn the intruder.

A schematic operation example of the monitoring camera system of FIG. 1 will be described.

Figure 2:
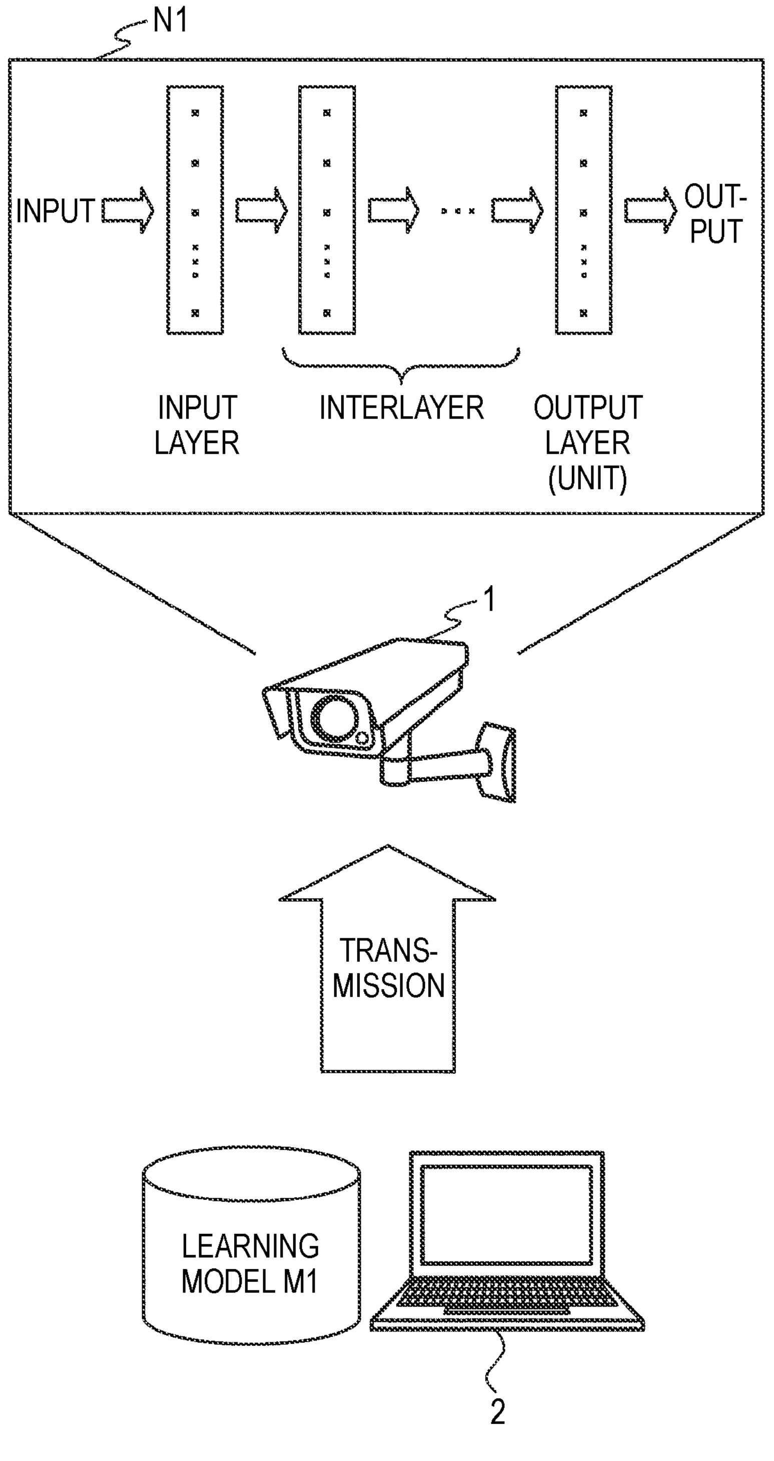
FIG. 2 is a diagram illustrating a schematic operation example of the monitoring camera system.

FIG. 2 is a diagram illustrating the schematic operation example of the monitoring camera system. In FIG. 2, the same configuration element as in FIG. 1 is denoted by the same reference numerals.

The terminal device 2 stores a learning model M1. The learning model M1 is a parameter group for characterizing a function of the AI mounted in the monitoring camera 1. That is, the learning model M1 is a parameter group for determining an AI detection target mounted in the monitoring camera 1. The AI of the monitoring camera 1 can change the detection target by changing the learning model M1.

For example, the learning model M1 may be a parameter group for determining a structure of a neural network N1 of the monitoring camera 1. The parameter group for determining the structure of the neural network N1 of the monitoring camera 1 includes, for example, information indicating a connection relation between units of the neural network N1 or a weighting factor or the like. The learning model may be referred to as a learned model, an AI model, or a detection model.

The terminal device 2 generates the learning model M1 according to an operation of the user U1. That is, the user U1 can set (select) a detection target to be detected by the monitoring camera 1 by using the terminal device 2.

For example, when the user U1 wants to detect an automobile in a parking lot with the monitoring camera 1, the user U1 uses the terminal device 2 to generate the learning model M1 that detects the automobile. Further, for example, when the user U1 wants to detect a boar appearing in the field with the monitoring camera 1, the user U1 uses the terminal device 2 to generate the learning model M1 that detects the boar. The generation of the learning model will be described in detail below.

If the user U1 generates the learning model by using the terminal device 2, the user U1 transmits the generated learning model M1 to the monitoring camera 1. The monitoring camera 1 constructs (forms) an AI based on the learning model M1 transmitted from the terminal device 2. That is, the monitoring camera 1 forms the learned AI based on the learning model M1.

For example, when the learning model M1 received from the terminal device 2 is a learning model that detects an automobile, the monitoring camera 1 forms a neural network that detects the automobile from an image. For example, when the learning model M1 received from the terminal device 2 is a learning model that detects a boar, the monitoring camera 1 forms a neural network that detects the boar from the image.

As such, the monitoring camera 1 receives the learning model M1 for constructing the AI for detecting a detection target from the terminal device 2. Then, the monitoring camera 1 forms the AI based on the received learning model M1 and detects a detection target from the image.

Thereby, the user U1 can flexibly set a detection target to be detected for the monitoring camera 1. For example, when the user U1 wants to detect an automobile with the monitoring camera 1, the user U1 may generate the learning model M1 for detecting the automobile by using the terminal device 2 and transmit the learning model to the monitoring camera 1. Further, for example, when the user U1 wants to detect a boar with the monitoring camera 1, the user U1 may generate the learning model M1 that detects the boar by using the terminal device 2 and transmit the learning model to the monitoring camera 1.

The learning model M1 is generated by the terminal device 2 and is not limited thereto. For example, the learning model M1 may be generated by an information processing device different from the terminal device 2. The learning model M1 generated by the information processing device may be transferred to the terminal device 2 communicating with the monitoring camera 1 and transmitted from the terminal device 2 to the monitoring camera 1.

Figure 3:
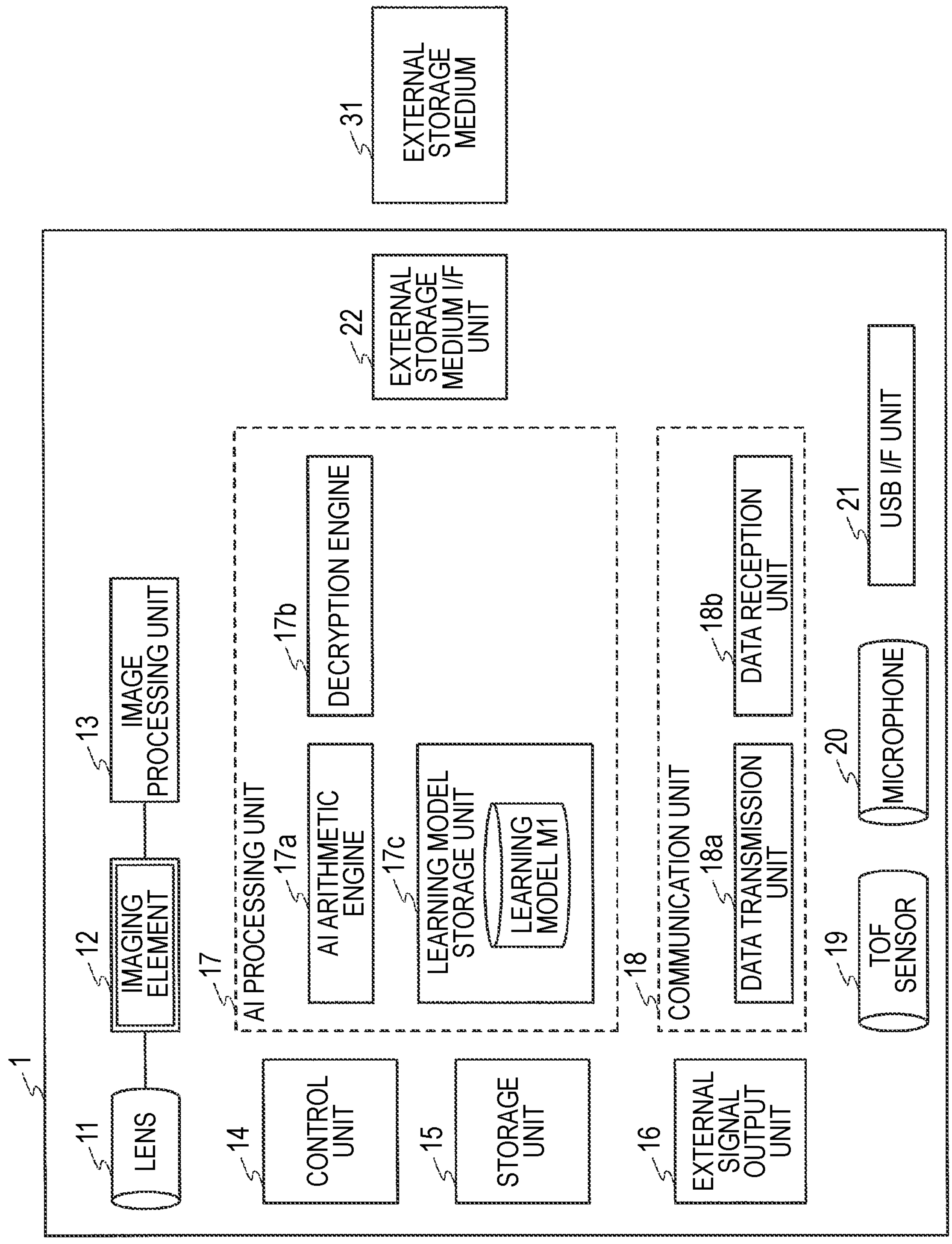
FIG. 3 is a diagram illustrating a block configuration example of a monitoring camera.

FIG. 3 is a diagram illustrating a block configuration example of the monitoring camera 1. FIG. 3 also illustrates an external storage medium 31 that is inserted into the monitoring camera 1 in addition to the monitoring camera 1. The external storage medium 31 is, for example, a storage medium such as an SD card (registered trademark).

As illustrated in FIG. 3, the monitoring camera 1 includes a lens 11, an imaging element 12, an image processing unit 13, a control unit 14, a storage unit 15, an external signal output unit 16, an AI processing unit 17, a communication unit 18, a time of flight (TOF) sensor 19, a microphone 20, a USB I/F (USB: Universal Serial Bus, I/F: Interface) unit 21, and an external storage medium I/F unit 22. Although not illustrated in FIG. 3, the monitoring camera 1 may include a pan tilt zoom (PTZ) control unit that can perform a pan rotation, a tilt rotation, and zoom processing.

The lens 11 forms an image of a subject on a light receiving surface of the imaging element 12. A lens having various focal lengths or imaging ranges can be used according to an installation location of the monitoring camera 1 or an imaging use as the lens 11 or the like.

The imaging element 12 converts light received on the light receiving surface into an electrical signal. The imaging element 12 is an image sensor such as a charge coupled device (CCD) or a complementary metal oxide semiconductor (CMOS). The imaging element 12 outputs an electrical signal (analog signal) corresponding to the light received on the light receiving surface to the image processing unit 13.

The image processing unit 13 converts an analog signal output from the imaging element 12 into a digital signal (digital image signal). The image processing unit 13 outputs a digital image signal to the control unit 14 and the AI processing unit 17. The lens 11, the imaging element 12, and the image processing unit 13 may be regarded as an imaging unit.

The control unit 14 controls the whole monitoring camera 1. The control unit 14 may be configured by, for example, a central processing unit (CPU) or a digital signal processor (DSP).

The storage unit 15 stores a program for operating the control unit 14 and the AI processing unit 17. Further, the storage unit 15 stores data for the control unit 14 and the AI processing unit 17 to perform arithmetic processing, or data for the control unit 14 and the AI processing unit 17 to control each unit. Further, the storage unit 15 stores image data captured by the monitoring camera 1. The storage unit 15 may be configured by a storage device such as a random access memory (RAM), a read only memory (ROM), a flash memory, and a hard disk drive (HDD).

The external signal output unit 16 is an output terminal that outputs an image signal output front the image processing unit 13 to the outside.

The AI processing unit 17 as an example of a processing unit detects a detection target from the image signal output from the image processing unit 13. The AI processing unit 17 may be configured by, for example, a CPU or a DSP. The AI processing unit 17 may be configured by, for example, a programmable logic device (PLD) such as a field-programmable gate array (FPGA).

The AI processing unit 17 includes an AI arithmetic engine 17*a*, a decryption engine 17*b*, and a learning model storage unit 17*c*.

The AI arithmetic engine 17*a* forms an AI based on the learning model M1 stored in the learning model storage unit 17*c*. For example, the AI arithmetic engine 17*a* forms a neural network based on the learning model M1. The image signal output from the image processing unit 13 is input to the AI arithmetic engine 17*a*. The AI arithmetic engine 17*a* detects a detection target from an image of the input image signal input by a neural network based on the learning model M1.

As will be described in detail below, the terminal device 2 generates the learning model M1. The terminal device 2 encrypts the generated learning model M1 and transmits the encrypted learning model to the monitoring camera 1. The decryption engine 17*b* receives the learning model M1 transmitted from the terminal device 2 via the communication unit 18, decrypts the received learning model M1, and stores decrypted learning model in the learning model storage unit 17*c*.

The learning model storage unit 17*c* stores the learning model M1 decrypted by the decryption engine 17*b*. The learning model storage unit 17*c* may be configured by a storage device such as a RAM, a ROM, a flash memory, and an HDD.

The communication unit 18 includes a data transmission unit 18*a* and a data receiving unit 18*b*, The data transmission unit 18*a* transmits data to the terminal device 2 through a short-range wireless communication such as the Wi-Fi (registered trademark) or the Bluetooth (registered trademark). The data receiving unit 18*b* receives data transmitted from the terminal device 2 through the short-range wireless communication such as the Wi-Fi or the Bluetooth.

The data transmission unit 18*a* may transmit data to the terminal device 2 through a network cable (wired) such as an Ethernet (registered trademark) cable. The data receiving unit 18*b* may receive data transmitted from the terminal device 2 through the network cable such as the Ethernet cable.

The TOF sensor 19 measures, for example, a distance to the detection target. The TOF sensor 19 outputs a signal (digital signal) of the measured distance to the control unit 14.

Although not illustrated in FIG. 3, the sensor included in the monitoring camera 1 is not limited to the above-described TOF sensor 19. For example, the monitoring camera 1 may include other sensors such as a temperature sensor (not illustrated), a vibration sensor (not illustrated), a human sensor (not illustrated), and a PTZ sensor (not illustrated).

The temperature sensor measures a temperature around the monitoring camera 1. The temperature sensor is realized by, for example, a non-contact temperature sensor that measures a temperature by measuring infrared rays in an imaging region of the monitoring camera 1.

The vibration sensor measures a shake (vibration) around the monitoring camera 1 or of the monitoring camera 1 itself. A vibration sensor is realized by the control unit 14 of, for example, a gyro sensor or the monitoring camera 1. When realized by the control unit 14, the control unit 14 performs image analysis processing for each of two images (still images) continuously captured among the image data and measures the sake (vibration) around the monitoring camera 1 or of the monitoring camera 1 itself based on a positional deviation amount of coordinates having the same feature amount.

The human sensor is a sensor that detects a man passing through an imaging region of the monitoring camera 1 and is realized by, for example, an infrared sensor, an ultrasonic sensor, a visible light sensor, or a sensor obtained by combining these sensors.

A PTZ sensor as an example of a sensor measures an operation of a motor (not illustrated) driven by a PTZ control unit during a pan rotation, a tilt rotation, and zoom processing. The control unit 14 can determine whether or not the preset pan rotation, tilt rotation, and zoom processing are performed based on the measured data of the PTZ sensor.

The microphone 20 as an example of a sound collection unit converts a voice into an electrical signal (analog signal). The microphone 20 converts an analog signal into a digital signal and outputs the digital signal to the control unit 14.

A device such as a USB memory or an information processing device is connected to the USB I/F unit 21 via a USB connector. The USB I/F unit 21 outputs a signal transmitted from a device connected to the USB I/F unit 21 to the control unit 14. Further, the USB I/F unit 21 transmits a signal output from the control unit 14 to the device connected to the USB I/F unit 21.

The external storage medium 31 such as an SD card is inserted into and removed from the external storage medium I/F unit 22.

The learning model M1 may be stored in the external storage medium 31 from the terminal device 2. The decryption engine 17*b* acquires the learning model M1 from the external storage medium 31 attached to the external storage medium I/F unit 22, decrypts the acquired learning model M1, and stores the learning model in the learning model storage unit 17*c*. The learning model M1 may be a learning model additionally learned by the terminal device 2 by an operation of the monitoring camera 1 or a user.

Further, the learning model M1 may be stored in the USB memory from the terminal device 2. The decryption engine 17*b* may acquire the learning model M1 from the USB memory attached to the USB I/F unit 21, decrypts the acquired learning model M1, and store the learning model in the learning model storage unit 17*c*. The USB memory may also be regarded as an external storage medium. Here, the learning model M1 acquired from the USB memory may be a learning model generated or additionally learned by another monitoring camera or may be a learning model additionally learned by the terminal device 2.

Figure 4:
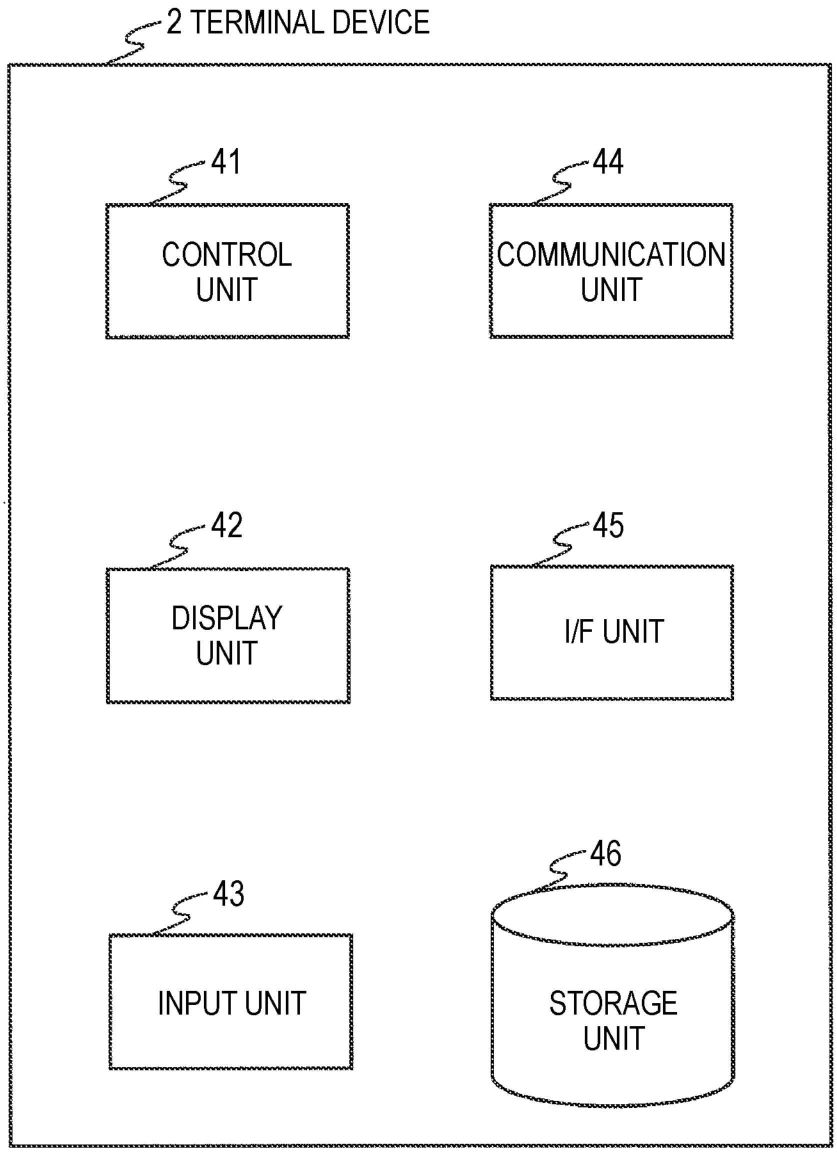
FIG. 4 is a diagram illustrating a block configuration example of a terminal device.

FIG. 4 is a diagram illustrating a block configuration example of the terminal device 2. As illustrated in FIG. 4 the terminal device 2 includes a control unit 41, a display unit 42, an input unit 43, a communication unit 44, an IX unit 45, and a storage unit 46.

The control unit 41 controls the whole terminal device 2. The control unit 41 may be configured by, for example, a CPU.

The display unit 42 is connected to a display device (not illustrated). The display unit 42 outputs image data output from the control unit 41 to the display device.

The input unit 43 is connected to an input device (not illustrated) such as a keyboard or a touch panel overlapped on a screen of a display device. The input unit 43 is connected to an input device such as a mouse. The input unit

43 receives a signal, which is output from the input device, according to an operation of a user and outputs the signal to the control unit 41.

The communication unit 44 communicates with the monitoring camera 1. The communication unit 44 may communicate with the monitoring camera 1 through a short-range wireless communication such as the Wi-Fi or the Bluetooth. Further, the communication unit 44 may communicate with the monitoring camera 1 via a network cable such as an Ethernet cable.

For example, the external storage medium 31 is inserted into and removed from the I/F unit 45. Further, for example, a USB memory is inserted into and removed from the I/F unit 45.

The storage unit 46 stores a program for operating the control unit 41. The storage unit 46 stores data for the control unit 41 to perform arithmetic processing, data for the control unit 41 to control each unit, and the like. The storage unit 46 stores image data of the monitoring camera 1. The storage unit 46 may be configured by a storage device such as a RAM, a ROM, a flash memory, and an HDD.

Figure 5:
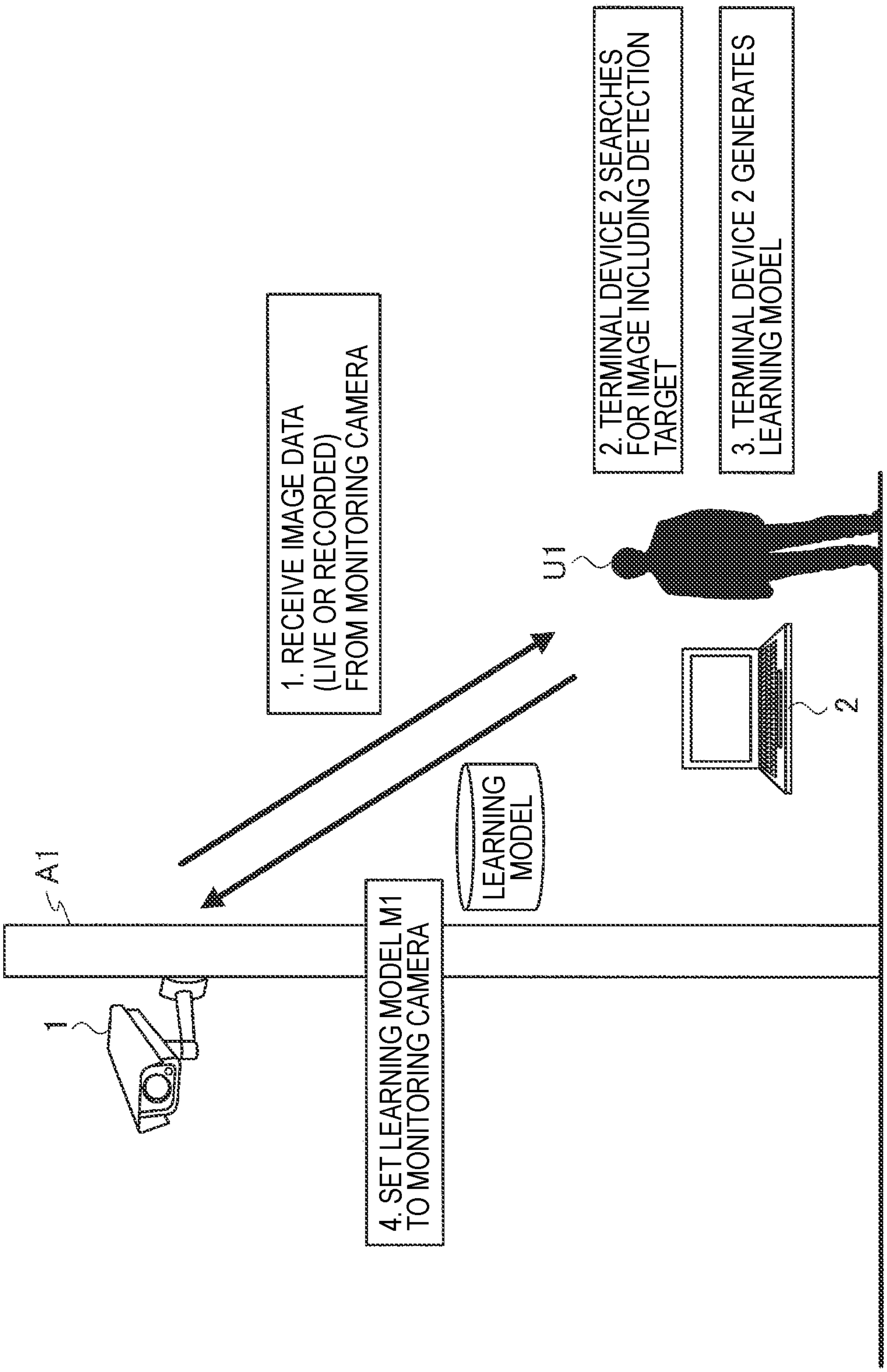
FIG. 5 is a diagram illustrating an example of generating a learning model and setting the learning model to the monitoring camera.

FIG. 5 is a diagram illustrating an example of generating a learning model and setting the learning model to the monitoring camera 1. In FIG. 5, the same configuration element as in FIG. 1 is denoted by the same reference numeral. For example, the monitoring camera 1 is installed in the structure A1 so as to image a parking lot.

1. The terminal device 2 starts up an application that generates a learning model according to an operation of the user U1. The terminal device 2 (application that generates the started learning model) receives image data from the monitoring camera 1 according to an operation of the user U1. The received image data may be live data or recorded data.

2. The terminal device 2 displays an image of the image data received from the monitoring camera 1 on a display device. The user U1 searches for an image including a detection target that is desired to be detected by the monitoring camera 1 from the image displayed on the display device of the terminal device 2.

For example, it is assumed that the user U1 wants to detect an automobile with the monitoring camera 1. In this case, the user U1 searches for an image including the automobile from the image of the parking lot received from the monitoring camera 1 and generates a still image of the searched image. It is desirable to generate a plurality of still images. The generated still image is stored in the storage unit 46.

3. The terminal device 2 generates a learning model from the still image stored in the storage unit 46 according to an operation of the user U1. For example, the terminal device 2 generates a learning model for the monitoring camera 1 to detect an automobile. Generation of the learning model will be described in detail below.

4. The terminal device 2 transmits (sets) the generated learning model to the monitoring camera 1 according to the operation of the user U1. The monitoring camera 1 forms a neural network according to the learning model which is transmitted from the terminal device 2 and detects an automobile. The monitoring camera 1 detects the automobile from image data captured by the imaging element 12, based on the formed neural network.

Although an example of generating a learning model for detecting an automobile is described in FIG. 5, a learning model for detecting another detection target can be generated in the same manner. For example, it is assumed that the monitoring camera 1 is installed in the structure A1 so as to image a field. It is assumed that the user U1 wants to detect a boar with the monitoring camera 1. In this case, the user U1 generates a still image of an image including the boar from an image of the image data captured by the monitoring camera 1. The terminal device 2 generates a learning model for detecting the boar from the still image stored in the storage unit 46 according to an operation of the user U1. Then, the terminal device 2 transmits the generated learning model to the monitoring camera 1.

Figure 6:
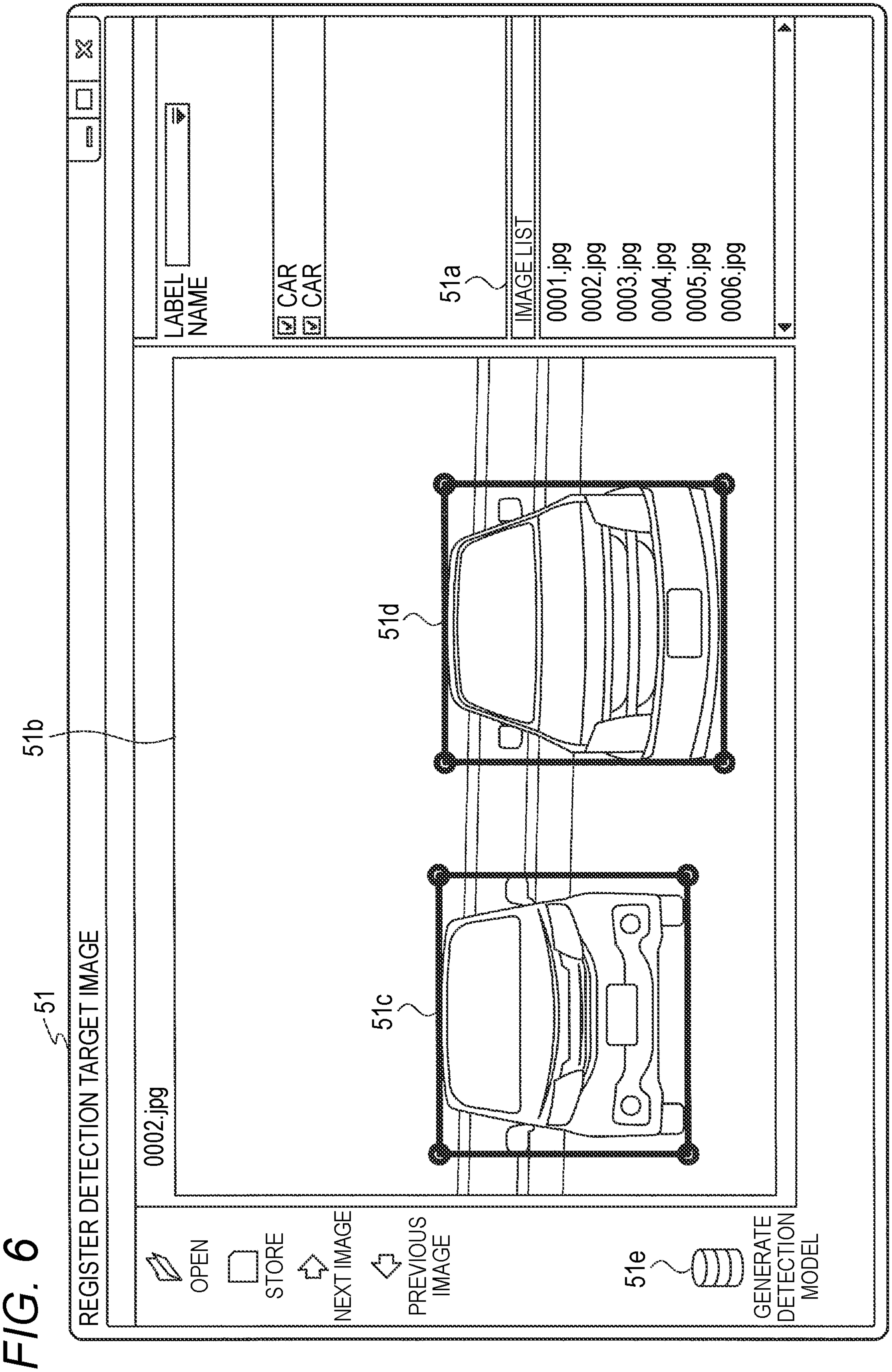
FIG. 6 is a diagram illustrating an example of generating the learning model.

FIG. 6 is a diagram illustrating an example of generating the learning model. A screen 51 illustrated in FIG. 6 is displayed on a display device of the terminal device 2.

As described with reference to FIG. 5, the terminal device 2 (application for generating the learning model) displays an image of the image data received from the monitoring camera 1 on the display device. The user operates the terminal device 2 to search for an image including a detection target to be detected by the monitoring camera 1 from the image displayed on the display device of the terminal device 2 and generates a still image of the searched image.

File names of the still images generated by the user from the image of the monitoring camera 1 are displayed in an image list 51*a* of the screen 51 of FIG. 6. In the example of FIG. 6, six still image files are generated.

When a still image file is selected from the image list 51*a* according to an operation of a user, the terminal device 2 displays an image of the selected still image file on the display device of the terminal device 2. A still image 51*b* illustrated in FIG. 6 indicates an image of the still image file "0002.jpg" selected by the user.

The user selects a detection target to be detected by the monitoring camera 1 from the still image 51*b*. For example, it is assumed that the user wants to detect an automobile with the monitoring camera 1. In this case, the user selects (marks) the automobile on the still image 51*b*. For example, the user operates the terminal device 2 to surround the automobile with frames 51*c* and 51*d*.

For example, the user marks the automobile in the whole or a part of the still image file displayed in the image list 51*a*. When the user marks the automobile in the whole or a part of the still image file, the user clicks an icon 51*e* of "generate detection model".

If the icon 51*e* is clicked, the terminal device 2 shifts to a screen for assigning a label to an image marked with a still image file (an image surrounded by the frames 51*c* and 51*d*). That is, the terminal device 2 shifts to a screen teaching that the image marked in the still image file is a detection target (automobile).

Figure 7:
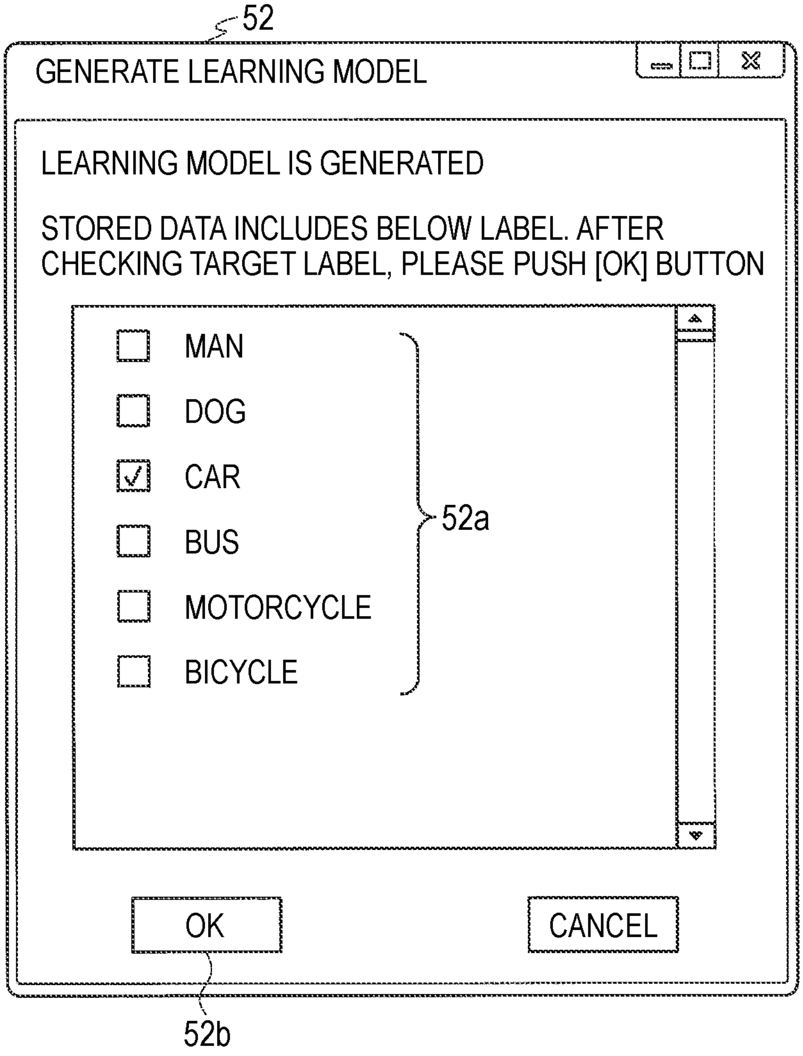
FIG. 7 is a diagram illustrating another example of generating the learning model.

FIG. 7 is a diagram illustrating an example of generating the learning model. A screen 52 illustrated in FIG. 7 is displayed on a display device of the terminal device 2. The screen 52 is displayed on the display device of the terminal device 2 if the icon 51*e* illustrated in FIG. 6 is clicked.

A label 52*a* is displayed on the screen 52. A user selects a check box displayed on a left side of the label 52*a* and assigns the label to a detection target marked with the still image.

In the example of FIG. 6, the user marks the automobile in the still image 51*b*. Thus, the user selects a check box corresponding to the label 52*a* of a car (automobile) on the screen 52 of FIG. 7.

When the user selects a label, the user clicks a button 52*b*. The terminal device 2 generates a learning model if the button 52*b* is clicked.

For example, if the button 52*b* is clicked, the terminal device 2 performs learning by using the image marked with the still image and the label. The terminal device 2 generates, for example, a parameter group for determining the structure of the neural network of the monitoring camera 1 by learning the image marked with the still image and the label. That is, the terminal device 2 generates a learning model for characterizing a function of the AI of the monitoring camera 1.

Figure 8:
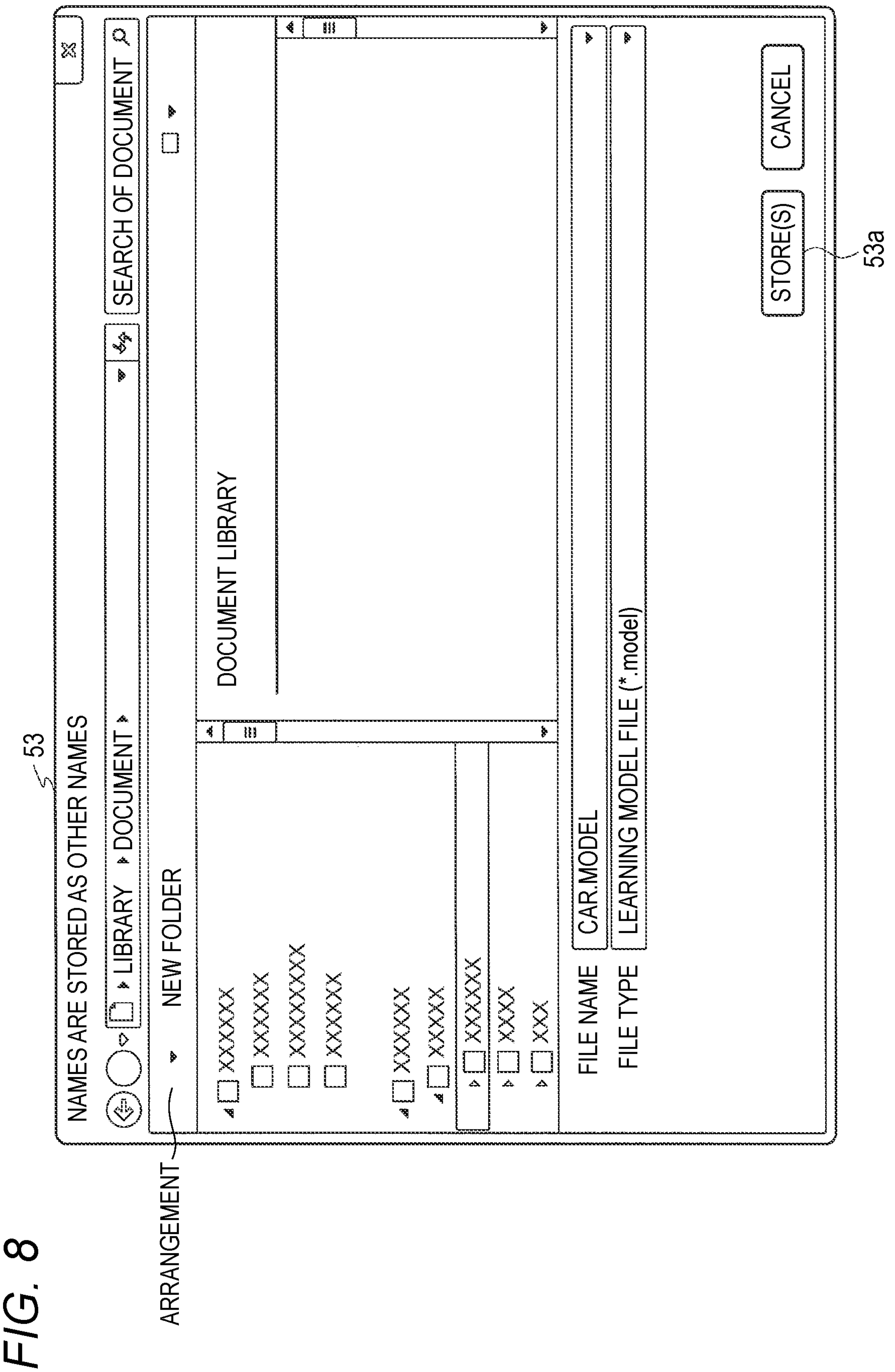
FIG. 8 is a diagram illustrating still another example of the generation of the learning model.

FIG. 8 is a diagram illustrating another example of generating the learning model. A screen 53 illustrated in FIG. 8 is displayed on the display device of the terminal device 2. The screen 53 is displayed on the display device of the terminal device 2 if the button 52*b* illustrated in FIG. 7 is clicked and a learning model is generated.

The user can assign the file name to the learning model generated by the terminal device 2 on the screen 53. In the example of FIG. 8, the file name is "car model". If the user assigns a file name to the learning model, the user clicks a button 53*a*. If the button 53*a* is clicked, the terminal device 2 stores the generated learning model in the storage unit 46.

The terminal device 2 transmits (sets) the learning model stored in the storage unit 46 to the monitoring camera 1 according to an operation of the user.

Figure 9:
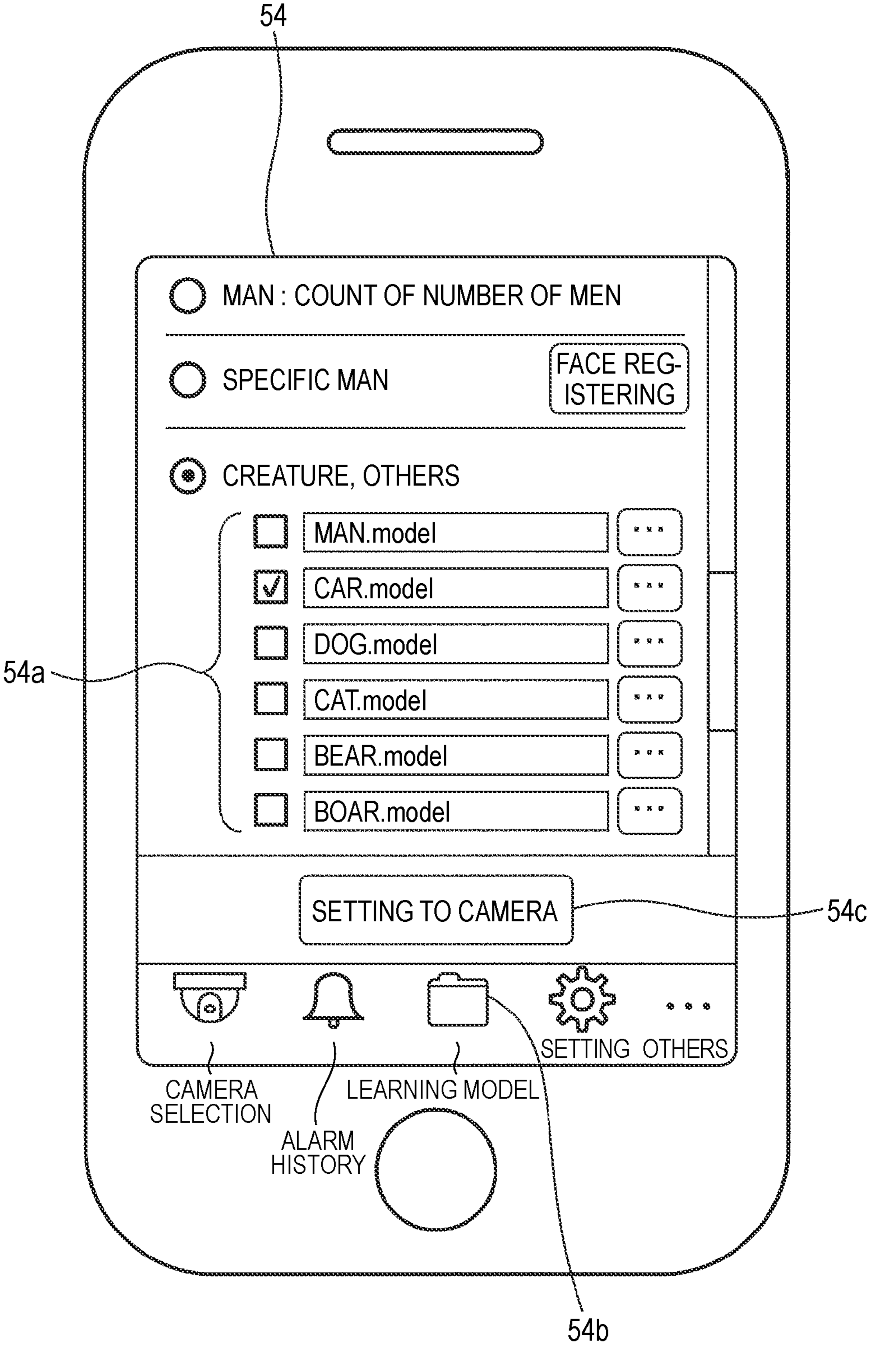
FIG. 9 is a diagram illustrating an example of setting the learning model.

FIG. 9 is a diagram illustrating an example of setting a learning model, Although a screen of the terminal device 2 is described by assuming a screen of a personal computer in the screen examples of FIGS. 6 to 8, a screen of a smartphone will be described in FIG. 9. If an application for generating a learning model starts, a screen 54 of FIG. 9 is displayed.

A learning model 54*a* indicates a file name of a learning model stored in the storage unit 46 of the terminal device 2. The learning model 54*a* is displayed on the display device of the terminal device 2 if an icon 54*b* on the screen 54 is tapped.

A user selects a learning model desired to be set in the monitoring camera 1. For example, the user selects a learning model to be set in the monitoring camera 1 by selecting a check box displayed on a left side of the learning model 54*a*. In the example of FIG. 9, the user selects a file name "car model".

If the learning model is selected, the user taps a button 54*c*. If the button 54*c* is tapped, the terminal device 2 transmits the learning model selected by the user to the monitoring camera 1. If the monitoring camera 1 receives the learning model, the monitoring camera 1 forms a neural network according to the received learning model.

Figure 10:
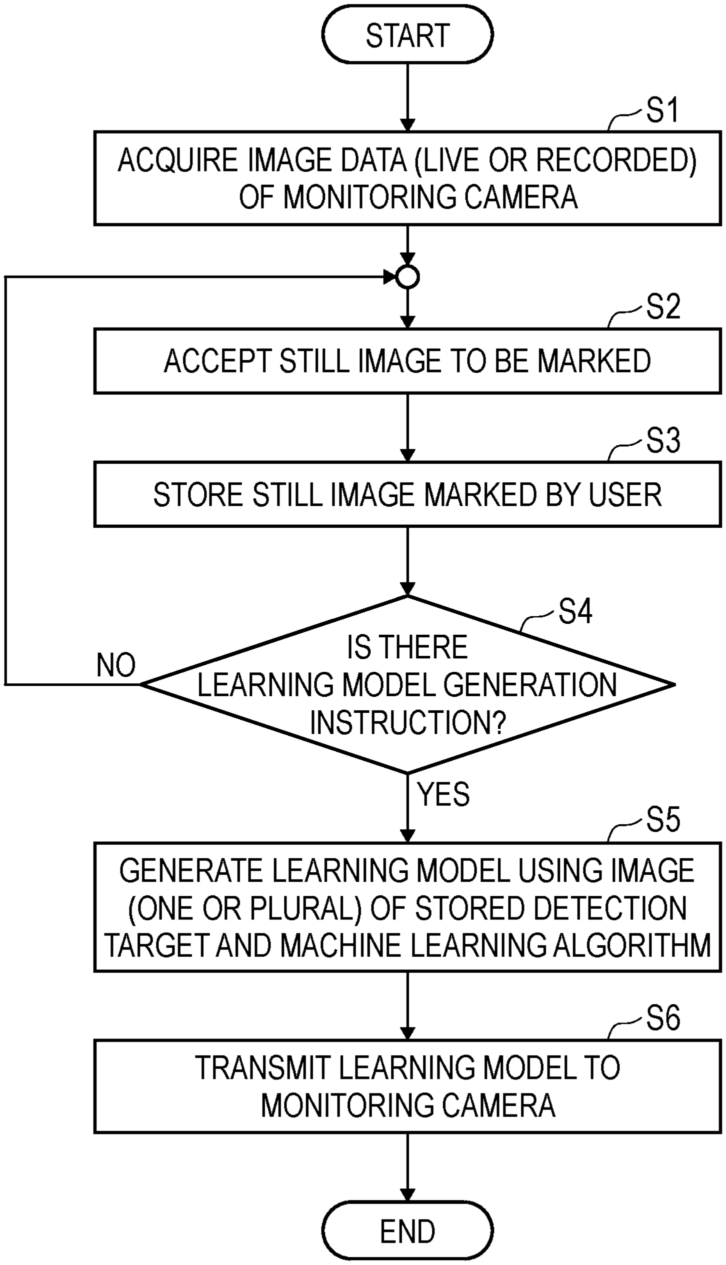
FIG. 10 is a flowchart illustrating an operation example of generating the learning model of the terminal device.

FIG. 10 is a flowchart illustrating an operation example of generating a learning model of the terminal device 2. The control unit 41 of the terminal device 2 acquires image data of the monitoring camera 1 (Step S1). The image data may be live data or recorded data. The control unit 41 of the terminal device 2 may acquire image data of the monitoring camera 1 from a recorder that records an image of the monitoring camera 1.

A user operates the terminal device 2 to search for an image including a detection target from the image of the monitoring camera 1 and generates a still image including the detection target.

The control unit 41 of the terminal device 2 accepts selection of a still image to be marked on the detection target from the user (step S2). For example, the control unit 41 of the terminal device 2 accepts the selection of the still image to be marked on the detection target from the image list 51*a* in FIG. 6.

The control unit 41 of the terminal device 2 accepts a marking operation for the detection target from the user. For example, the control unit 41 of the terminal device 2 accepts the marking operation by using the frames 51*c* and 51*d* illustrated in FIG. 6. The control unit 41 of the terminal device 2 stores the still image marked by the user in the storage unit 46 (step S3).

The control unit 41 of the terminal device 2 determines whether or not there is a learning model generation instruction from the user (step S4). For example, the control unit 41 of the terminal device 2 determines whether or not the icon 51*e* in FIG. 6 is clicked. When the control unit 41 of the terminal device 2 determines that there is no instruction to generate the learning model from the user ("No" in S4), the processing proceeds to step S2.

Meanwhile, when the control unit 41 of the terminal device 2 determines that there is an instruction to generate the learning model from the user ("Yes" in S4), the control unit 41 accepts a labeling operation from the user (see FIG. 7). Then, the control unit 41 of the terminal device 2 generates the learning model with the still image stored in the storage unit 46, and a machine learning algorithm (step S5). The machine learning algorithm may be, for example, deep learning.

The control unit 41 of the terminal device 2 transmits the generated learning model to the monitoring camera 1 according to an operation of the user (Step S6).

Figure 11:
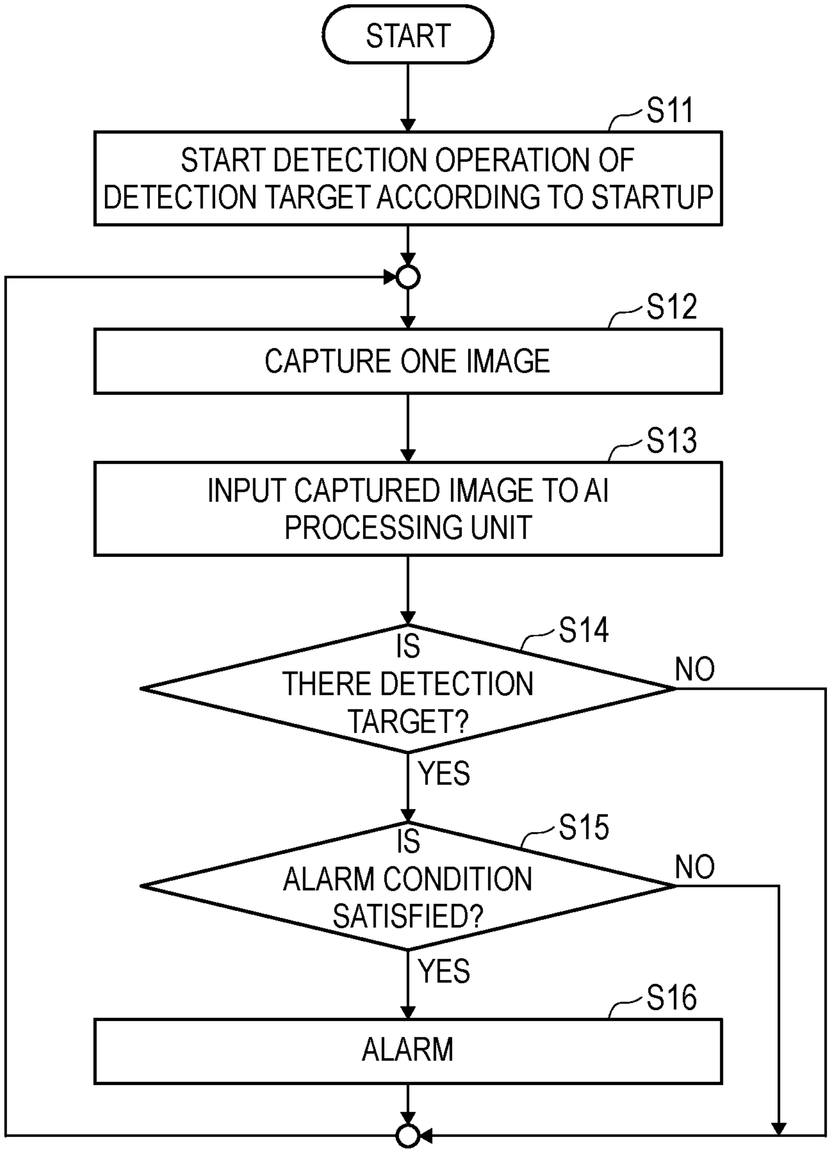
FIG. 11 is a flowchart illustrating an operation example of the monitoring camera.

FIG. 11 is a flowchart illustrating an operation example of the monitoring camera 1. The AI processing unit 17 of the monitoring camera 1 starts a detection operation of a detection target according to startup of the monitoring camera 1 (step S11). For example, the AI processing unit 17 of the monitoring camera 1 forms a neural network based on the learning model transmitted from the terminal device 2 and starts the detection operation of the detection target.

The imaging element 12 of the monitoring camera 1 captures one image (one frame) (step S12).

The control unit 14 of the monitoring camera 1 inputs the image captured in step S12 to the AI processing unit 17 (step S13).

The AI processing unit 17 of the monitoring camera 1 determines whether or not the detection target is included in the image input in step S13 (step S14).

When it is determined in step S14 that the detection target is not included ("No" in S14), the control unit 14 of the monitoring camera 1 proceeds to step S12.

Meanwhile, when it is determined in step S14 that the detection target is included ("Yes" in S14), the control unit 14 of the monitoring camera 1 determines whether or not an alarm condition is satisfied (step S15).

The alarm condition includes, for example, detection of parking of an automobile in a parking lot. For example, if the AI processing unit 17 detects the automobile, the control unit 14 of the monitoring camera 1 may determine that the alarm condition is satisfied.

Further, the alarm condition includes, for example, detection of a boar that is a harmful animal. For example, if the AI processing unit 17 detects the boar, the control unit 14 of the monitoring camera 1 may determine that the alarm condition is satisfied.

Further, the alarm condition includes, for example, the number of visitors and the like. For example, the control unit 14 of the monitoring camera 1 counts the number of men detected by the AI processing unit 17 and may determine that the alarm condition is satisfied if the number of counted men reaches a preset number.

Further, the alarm condition includes, for example, detection of a specific man. For example, if the AI processing unit 17 detects the specific man (a face of the specific man), the control unit 14 of the monitoring camera 1 may determine that the alarm condition is satisfied.

Further, the alarm condition includes, for example, detection of inflorescence of a flower. For example, the control unit 14 of the monitoring camera 1 may determine that the alarm condition is satisfied if the AI processing unit 17 detects the inflorescence of the flower.

When the control unit 14 of the monitoring camera 1 determines in step S15 that the alarm condition is not satisfied ("No" in S15), the processing proceeds to step S12.

Meanwhile, when it is determined that the alarm condition is satisfied in step S15 ("Yes" in S15), the control unit 14 of the monitoring camera 1 emits a sound or the like by using the alarm device 3 (step S16).

As described above, the communication unit 18 of the monitoring camera 1 receives a learning model relating to a detection target from the terminal device 2. The AI processing unit 17 of the monitoring camera 1 constructs an AI based on the learning model received by the communication unit 18 and detects the detection target from an image captured by the imaging element 12 by using the constructed AI. Thereby, a user can flexibly set the detection target to be detected for the monitoring camera 1.

Further, the learning model is generated by using an image taken by the monitoring camera 1 installed on the structure A1. Thereby, since the monitoring camera 1 constructs the AI based on the learning model generated by learning from the image captured by the monitoring camera 1, it is possible to detect the detection target with a high accuracy.

Modification Example

The control unit 14 of the monitoring camera 1 may store the detection result in the external storage medium 31 inserted in the external storage medium I/F unit 22. The control unit 14 of the monitoring camera 1 may store the detection result in a USB memory inserted in the USB I/F unit 21. The control unit 14 of the monitoring camera 1 may store the detection result in the storage unit 15 and transmit the detection result stored in the storage unit 15 to the external storage medium 31 inserted in the external storage medium I/F unit 22 or to an USB memory inserted in the USB I/F unit 21. The control unit 41 of the terminal device 2 may acquire the detection result stored in the external storage unit medium or the USB memory via the I/F unit 45, take statistics of the acquired detection result, and analyze the statistical result. The control unit 41 of the terminal device 2 may use the analysis result for generating a learning model.

Further, the control unit 14 of the monitoring camera 1 may transmit the detection result to the terminal device 2 via the communication unit 18. The control unit 41 of the terminal device 2 may take statistics of the detection result transmitted from the monitoring camera 1 and analyze the statistical result. The control unit 41 of the terminal device 2 may use the analysis result for generating a learning model.

Second Embodiment

In the first embodiment, a learning model is generated by the terminal device 2. In a second embodiment, a case where a learning model is stored in a server connected to a public network such as the Internet will be described.

Figure 12:
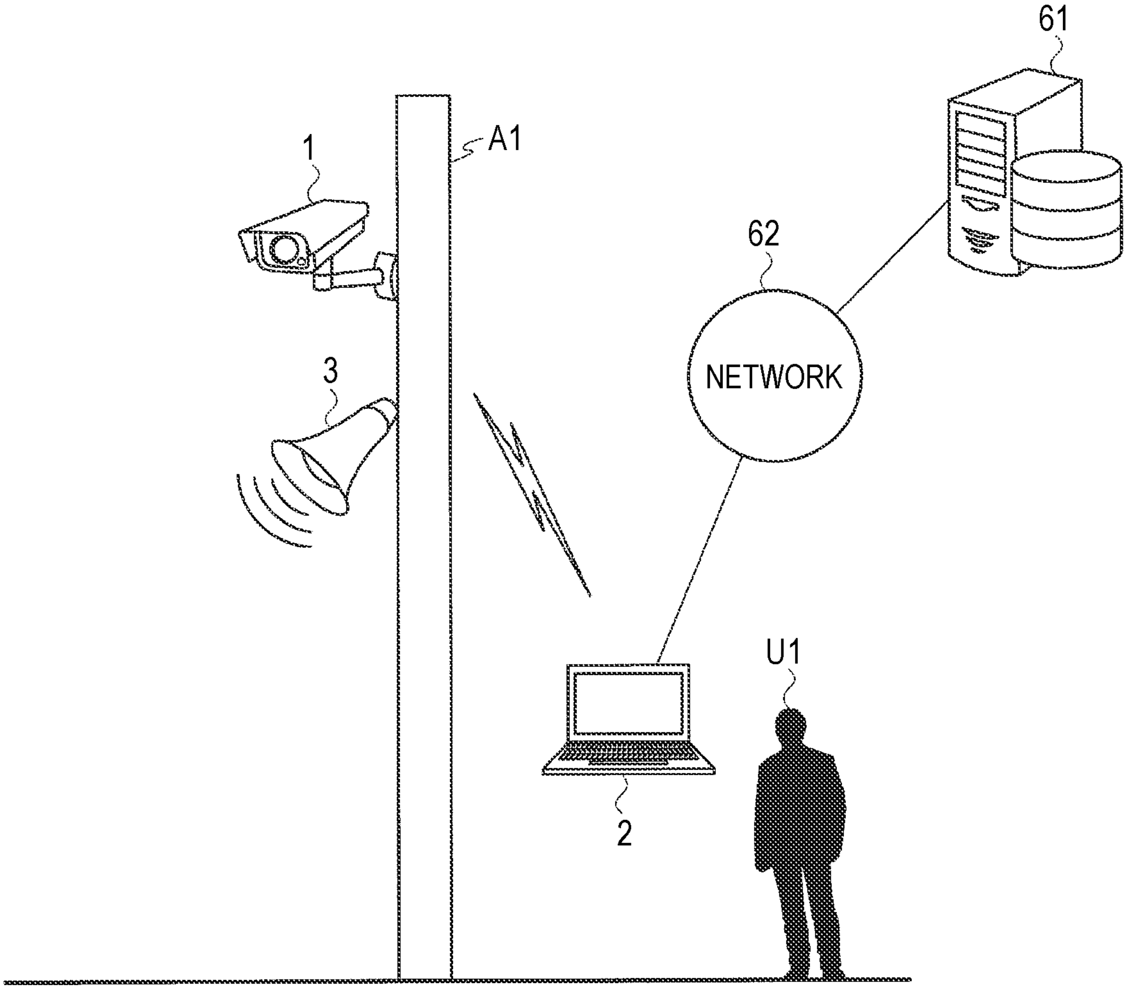
FIG. 12 is a diagram illustrating an example of a monitoring camera system according to a second embodiment.

FIG. 12 is a diagram illustrating an example of a monitoring camera system according to the second embodiment. In FIG. 12, the same configuration element as in FIG. 1 is denoted by the same reference numeral. Hereinafter, a different portion from the first embodiment will be described.

A monitoring camera system of FIG. 12 includes a server 61 for the monitoring camera system of FIG. 1. The server 61 may have the same block configuration as the block configuration illustrated in FIG. 4. However, a communication unit of the server 61 is connected to a network 62, for example, by wire. The server 61 may be referred to as an information processing device.

The network 62 is a public network such as the Internet. The server 61 communicates with the terminal device 2 via, for example, the network 62. The communication unit 44 of the terminal device 2 may be connected to the network 62, for example, by wire or may be connected to the network 62 via a wireless communication network such as a mobile phone.

The server 61 has an application for generating a learning model. The server 61 generates the learning model from an image of the monitoring camera 1 and stores the generated learning model in a storage unit.

For example, the server 61 may be managed by a manufacturer that manufactures the monitoring camera 1. For example, the manufacturer of the monitoring camera 1 receives image data from a purchaser who purchases the monitoring camera 1. The manufacturer of the monitoring camera 1 uses the server 61 to generate a learning model from image data provided by the purchaser of the monitoring camera 1. The purchaser of the monitoring camera 1 is considered to image various detection targets by using the monitoring camera 1, and the manufacturer of the monitoring camera 1 can generate various types of learning models from image data obtained by imaging various detection targets. Further, the manufacturer of the monitoring camera 1 can generate a learning model from many pieces of image data and generate the learning model with a high detection accuracy.

Further, the server 61 may be managed by, for example, a builder who installs the monitoring camera 1 on the structure A1. The builder of the monitoring camera 1 receives image data from the purchaser of the monitoring camera 1 in the same manner as the manufacturer. The builder of the monitoring camera 1 can generate various types of learning models from image data obtained by imaging various detection targets. Further, the builder of the monitoring camera 1 can generate a learning model from many pieces of image data and generate the learning model with a high detection accuracy.

The builder of the monitoring camera 1 may install the monitoring camera 1 in the structure A1, for example, only for detection of a specific detection target. For example, the builder of the monitoring camera 1 may install the monitoring camera 1 in the structure A1 only for detection of a harmful animal. In this case, since the builder of the monitoring camera 1 is provided with image data relating to the harmful animal from the purchaser of the monitoring camera 1, it is possible to generate a learning model specialized for detection of the harmful animal.

The terminal device 2 accesses the server 61 according to an operation of the user U1 and receives a learning model from the server 61. The terminal device 2 transmits the learning model received from the server 61 to the monitoring camera 1 via a short-range wireless communication such as the Wi-Fi or the Bluetooth. Further, the terminal device 2, may transmit the learning model received from the server 61 to the monitoring camera 1 via, for example, a network cable.

Further, the terminal device 2 may store the learning model received from the server 61 in the external storage medium 31 via the I/F unit 45 in accordance with the operation of the user U1. The user U1 may insert the external storage medium 31 into the external storage medium I/F unit 22 of the monitoring camera 1 and set the learning model stored in the external storage medium 31 in the monitoring camera 1.

Figure 13:
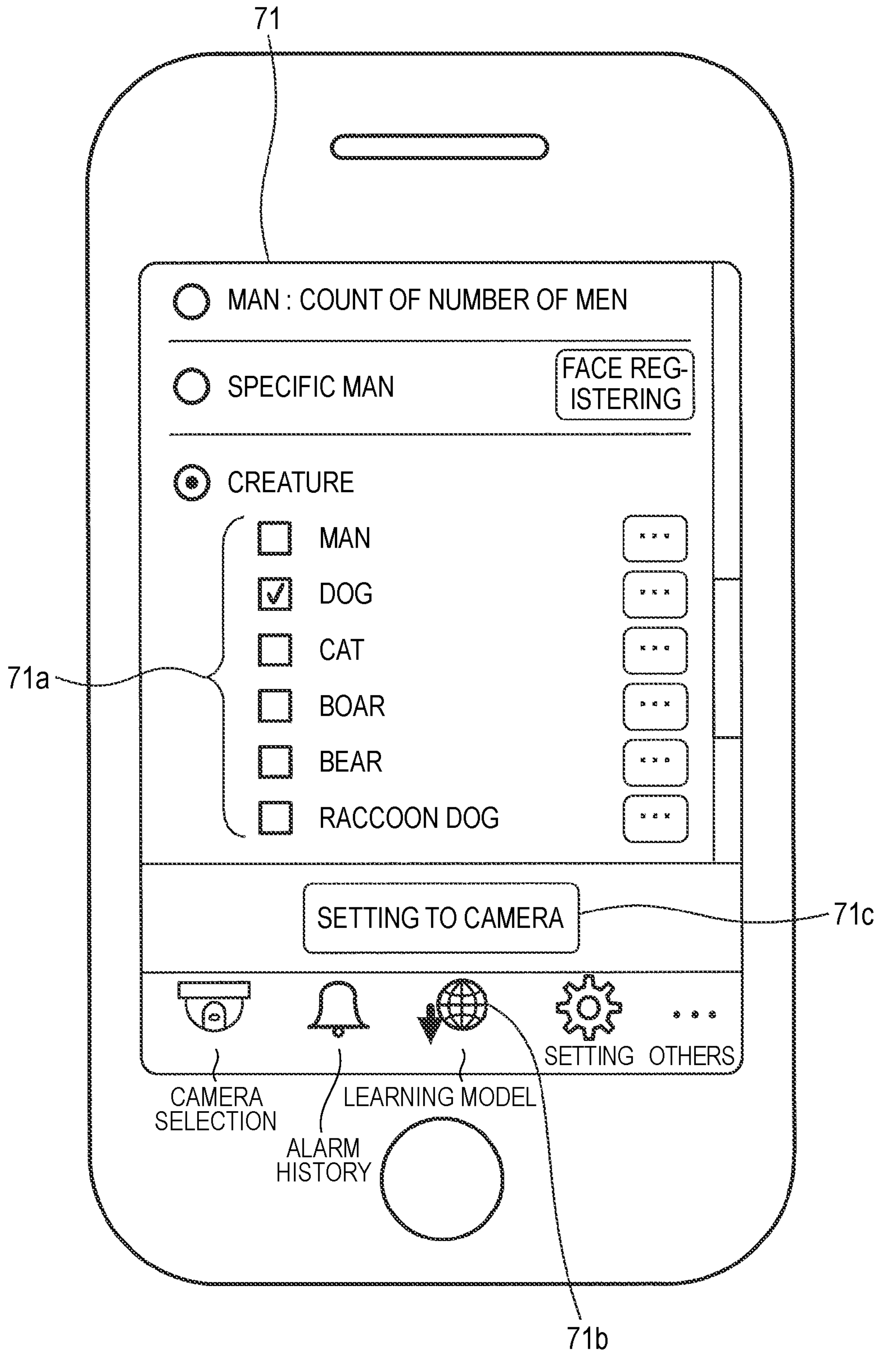
FIG. 13 is a diagram illustrating an example of selecting the learning model in the server.

FIG. 13 is a diagram illustrating an example of selecting a learning model in the server 61. A screen 71 in FIG. 13 is displayed on a display device of the terminal device 2. The screen 71 is displayed if an application for generating the learning model starts up.

A learning model 71*a* on the screen 71 indicates a name of the learning model stored in the server 61. The learning model 71*a* is displayed on the display device of the terminal device 2 if an icon 71*b* on the screen 71 is tapped.

A user selects a learning model desired to be set in the monitoring camera 1. For example, the user selects a learning model to be set in the monitoring camera 1 by selecting a check box displayed on a left side of the learning model 71*a*. In the example of FIG. 13, the user selects a learning model name "dog".

If the learning model is selected, the user taps a button 71*c*. If the button 71*c* is tapped, the terminal device 2 receives the learning model selected by the user from the server 61 and transmits the received learning model to the monitoring camera 1. If the monitoring camera 1 receives the learning model, the monitoring camera 1 forms a neural network based on the received learning model.

Figure 14:
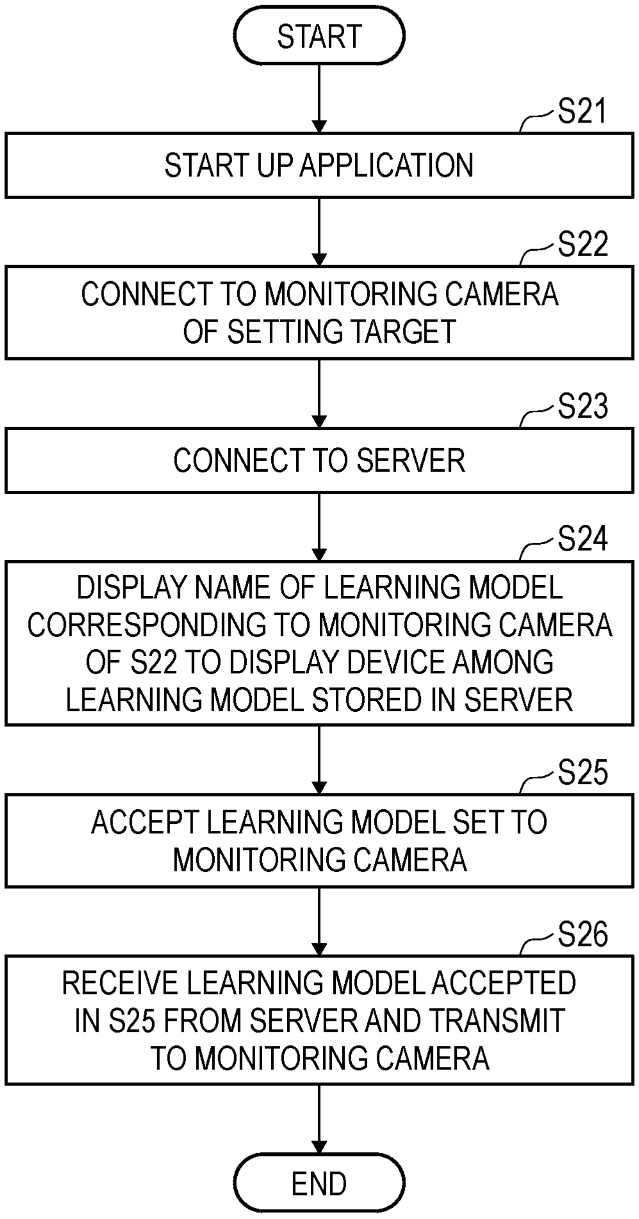
FIG. 14 is a flowchart illustrating an example of a setting operation of the learning model in the monitoring camera of the terminal device.

FIG. 14 is a flowchart illustrating a setting operation example of the learning model to the monitoring camera 1 of the terminal device 2.

The control unit 41 of the terminal device 2 starts up an application that sets a learning model to the monitoring camera 1 according to an operation of a user (step S21).

The control unit 41 of the terminal device 2 is connected to the monitoring camera 1 that sets the learning model according to the operation of the user (step S22).

The control unit 41 of the terminal device 2 is connected to the server 61 connected to the network 62 according to the operation of the user (step S23).

The control unit 41 of the terminal device 2 displays a name of the learning model corresponding to the monitoring camera 1 connected in step S22 in a display device, among the learning models stored in the server 61 (step S24). For example, the control unit 41 of the terminal device 2 displays the name of the learning model on the display device as illustrated in the learning model 71*a* in FIG. 13.

The server 61 stores learning models corresponding to various types of monitoring cameras. The control unit 41 of the terminal device 2 displays the name of the learning model corresponding to the monitoring camera 1 connected in step S22 among the learning models corresponding to various types of monitoring cameras on the display device.

The control unit 41 of the terminal device 2 accepts the learning model set to the monitoring camera 1 from the user (step S25), For example, the control unit 41 of the terminal device 2 accepts the learning model set to the monitoring camera 1 by using the check box displayed on the left side of the learning model 71*a* in FIG. 13.

The control unit 41 of the terminal device 2 receives the learning model received in step S25 from the server 61 and transmits the received learning model to the monitoring camera 1 (step S26).

As described above, the server 61 may generate and store learning data from image data of various monitoring cameras. The terminal device 2 may acquire learning data stored in the server 61 and set the learning data to the monitoring camera 1. Thereby, the monitoring camera 1 can construct an AI based on various types of learning models.

Modification Example

In the above description, the control unit 41 of the terminal device 2 transmits the learning model received from the server 61 to the monitoring camera 1 via a short-range wireless communication, the external storage medium 31, or the network cable, which is not limited thereto. The control unit 41 of the terminal device 2 may transmit the learning model received from the server 61 to the monitoring camera 1 via the network 62.

Figure 15:
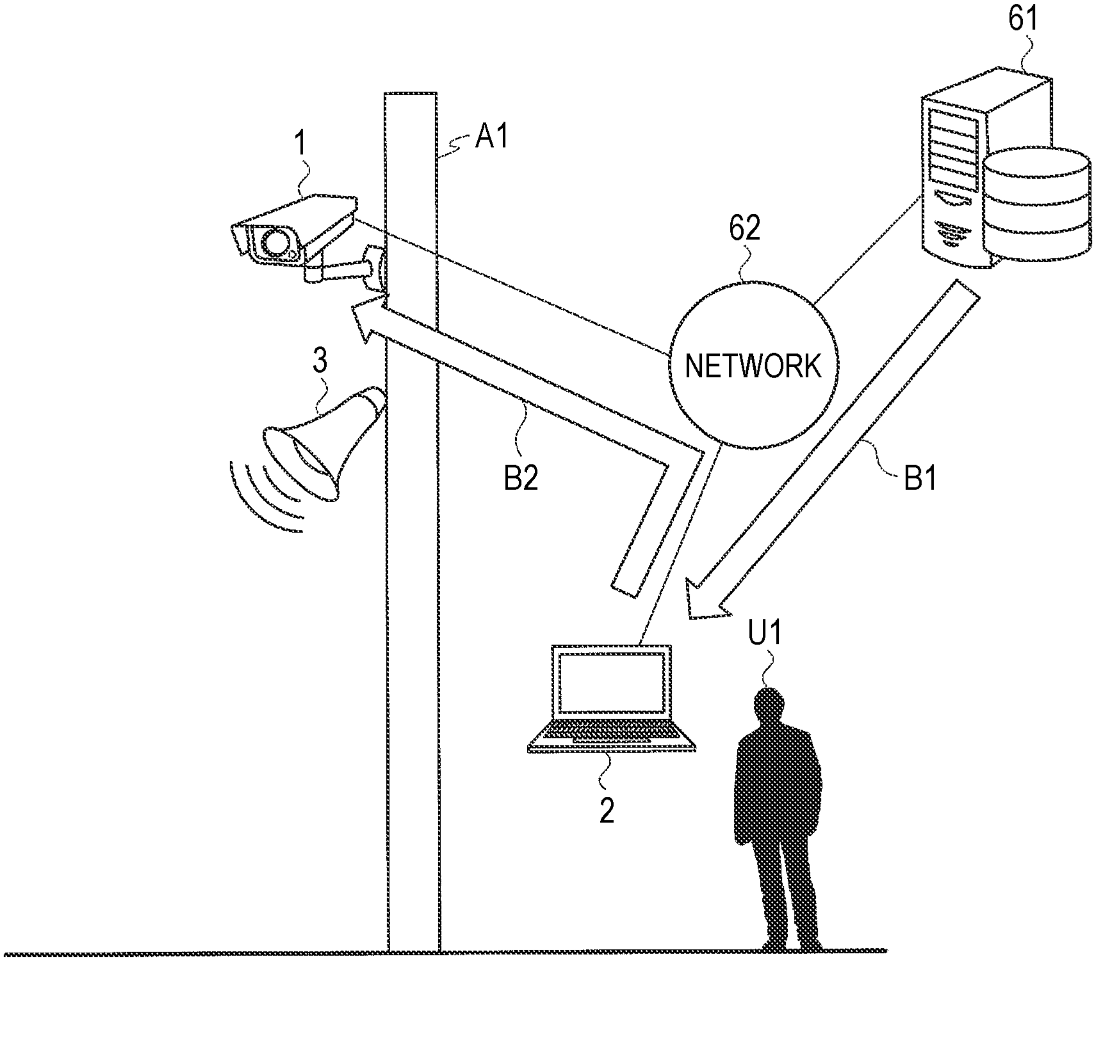
FIG. 15 is a diagram illustrating a modification example of the monitoring camera system.

FIG. 15 is a diagram illustrating a modification example of the monitoring camera system. In FIG. 15, the same configuration element as in FIG. 12 is denoted by the same reference numeral.

In FIG. 15, the communication unit 18 of the monitoring camera 1 is connected to the network 62. For example, the communication unit 18 of the monitoring camera 1 may be connected to the network 62 via a wire such as a network cable or may be connected to the network 62 via a wireless communication network such as a mobile phone.

The control unit 41 of the terminal device 2 receives a learning model from the server 61 via the network 62 as indicated by an arrow B1 in FIG. 15. The control unit 41 of the terminal device 2 transmits the learning model received from the server 61 to the monitoring camera 1 via the network 62 as indicated by an arrow B2 in FIG. 15.

As described above, the control unit 41 of the terminal device 2 may transmit the learning model received from the server 61 to the monitoring camera 1 via the network 62.

The control unit 41 of the terminal device 2 may instruct the server 61 to transmit the learning model to the monitoring camera 1. That is, the monitoring camera 1 may receive learning data from the server 61 without passing through the terminal device 2.

Third Embodiment

In a third embodiment, if the monitoring camera 1 satisfies an alarm condition, the monitoring camera 1 transmits a mail to a preset address. That is, if the monitoring camera 1 satisfies the alarm condition, the monitoring camera 1 notifies a user that the alarm condition is satisfied by mail.

Figure 16:
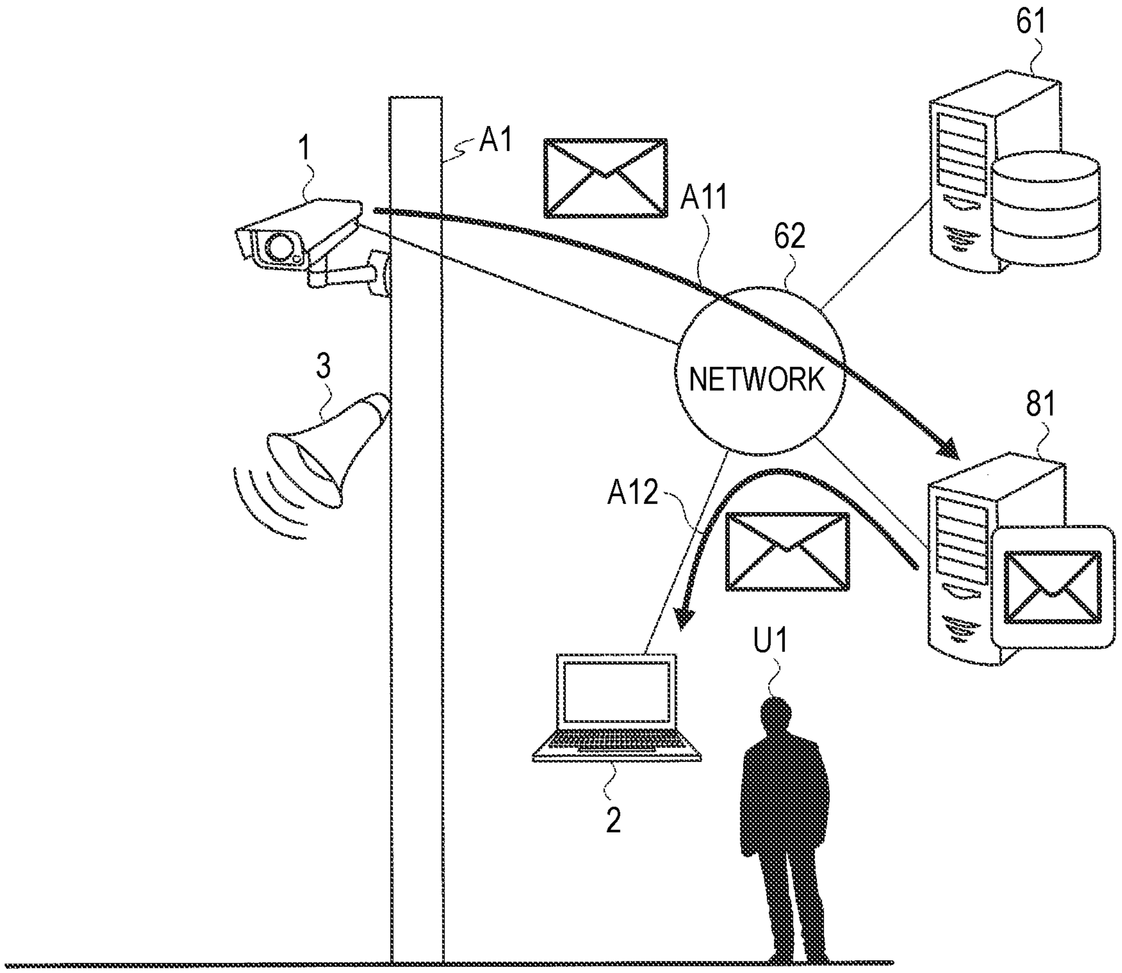
FIG. 16 is a diagram illustrating an example of a monitoring camera system according to a third embodiment.

FIG. 16 is a diagram illustrating an example of a monitoring camera system according to the third embodiment. In FIG. 16, the same configuration element as in FIG. 15 is denoted by the same reference numeral.

A mail server 81 is illustrated in FIG. 16. The mail server 81 is connected to the network 62.

If the alarm condition is satisfied, the control unit 14 of the monitoring, camera 1 transmits a mail addressed to the terminal device 2 to the mail server 81 as indicated by an arrow A11. The email may include content indicating that the alarm condition is satisfied and an image of a detection target detected by the monitoring camera 1.

The mail server 81 notifies the terminal device 2 that the mail is received from the monitoring camera 1. The mail server 81 transmits the mail transmitted from the monitoring camera 1 to the terminal device 2 as indicated by the arrow A12 according to a request from the terminal device 2 received a mail reception notification.

In the monitoring camera 1, a mail transmission destination address may be set by the terminal device 2. An address of a terminal device other than the terminal device 2 may be set as the mail transmission destination address. For example, the address of the terminal device other than the terminal device 2 used by the user U1 may be set as the mail transmission destination address. Further, there may be a plurality of mail transmission destination addresses.

As such, if the monitoring camera 1 satisfies the alarm condition, the monitoring camera 1 may notify a user that the alarm condition is satisfied by mail. Thereby, the user can recognize that the detection target is detected by, for example, the monitoring camera 1.

Fourth Embodiment

In each of the above-described embodiments, an example in which a learning model is set for one monitoring camera 1 is described. In a fourth embodiment, an example in which learning models are set for a plurality of monitoring cameras will be described.

Figure 17:
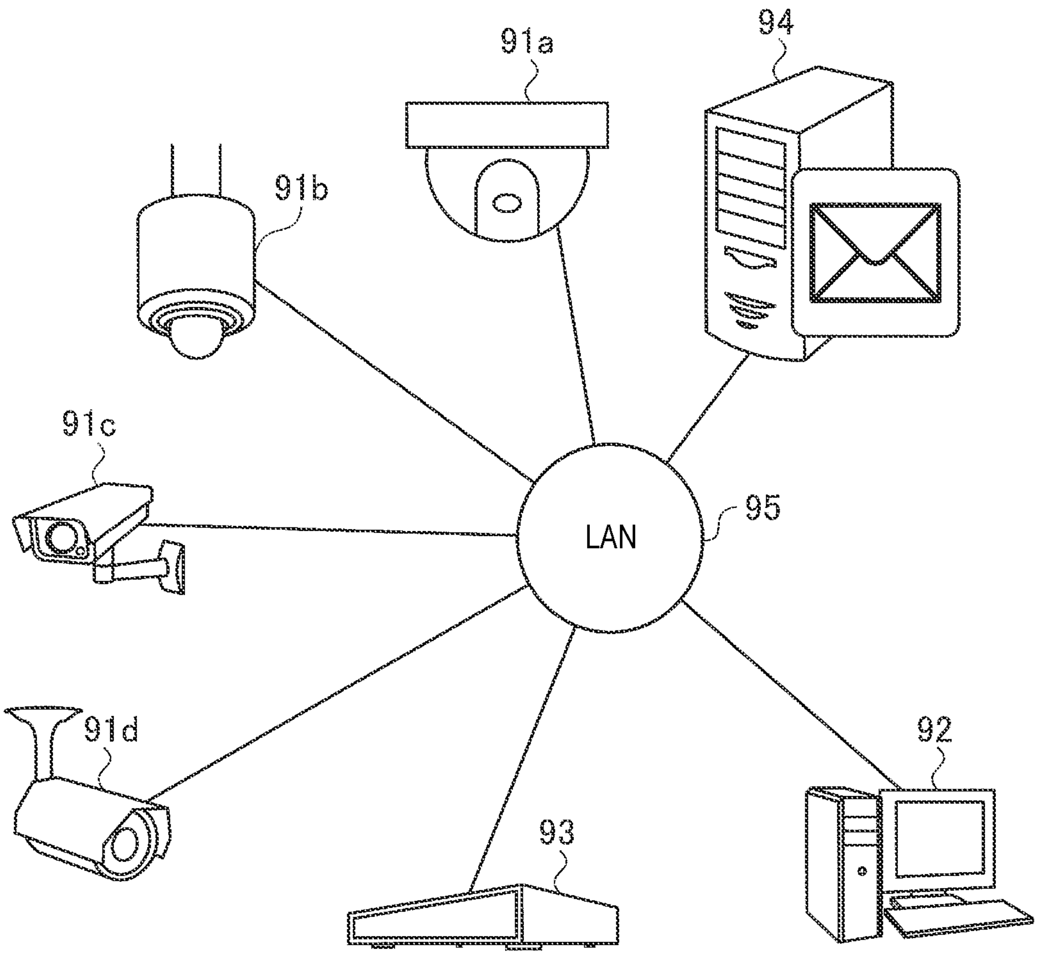
FIG. 17 is a diagram illustrating an example of a monitoring camera system according to a fourth embodiment.

FIG. 17 is a diagram illustrating an example of a monitoring camera system according to the fourth embodiment. As illustrated in FIG. 17, the monitoring camera system includes monitoring cameras 91*a* to 91*d*, a terminal device 92, a recorder 93, and a mail server 94. The monitoring cameras 91*a* to 91*d*, the terminal device 92, the recorder 93, and the mail server 94 are each connected to a local area network (LAN) 95.

The monitoring cameras 91*a* to 91*d* have the same functional blocks as the functional block of the monitoring camera 1 illustrated in FIG. 3. The terminal device 92 has the same functional block as the terminal device 2 illustrated in FIG. 4. The same learning model may be set for the monitoring cameras 91*a* to 91*d*, or different learning models may be set.

The recorder 93 stores image data of the monitoring cameras 91*a* to 91*d*. The terminal device 92 may generate learning models for the monitoring cameras 91*a* to 91*d* from live image data of the monitoring cameras 91*a* to 91*d*. Further, the terminal device 92 may generate learning models of the monitoring cameras 91*a* to 91*d* from recorded image data of the monitoring cameras 91*a* to 91*d* stored in the recorder 93. The terminal device 92 transmits the generated learning models to the monitoring cameras 91*a* to 91*d* via the LAN 95.

If the monitoring cameras 91*a* to 91*d* satisfy the alarm condition, the monitoring cameras 91*a* to 91*d* transmit a mail addressed to the terminal device 92 to the mail server 94. The mail server 94 transmits a mail transmitted from the monitoring camera 1 to the terminal device 2 according to a request from the terminal device 2.

As such, the plurality of monitoring cameras 91*a* to 91*d*, the terminal device 92, and the mail server 94 may be connected by the LAN 95. Then, the terminal device 92 may generate the learning models of the plurality of monitoring cameras 91*a* to 91*d* and transmit (set) the learning models to the monitoring cameras 91*a* to 91*d*. Thereby, a user can detect a detection target by using the plurality of monitoring cameras 91*a* to 91 *d*.

The types of each AI (AI arithmetic engines) of the monitoring cameras 91*a* to 91*d* may be different in each of the monitoring cameras 91*a* to 91*d*. In this case, the terminal device 92 generates a learning model suitable for the type of AI in each of the monitoring cameras 91*a* to 91*d*.

Modification Example

In the above description, the terminal device 92 generates a learning model, but the learning model may be stored in a server connected to a public network such as the Internet.

Figure 18:
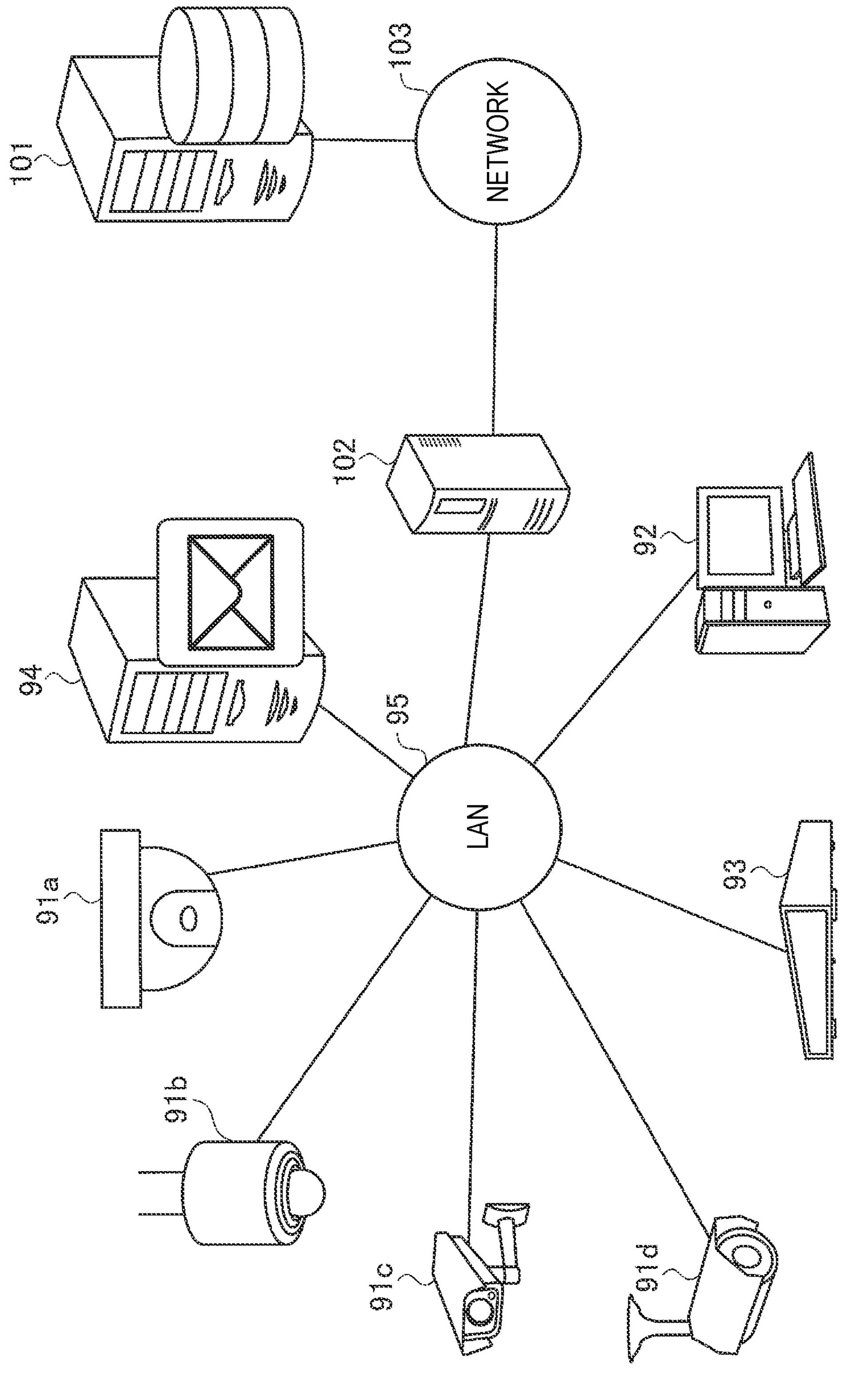
FIG. 18 is a diagram illustrating a modification example of the monitoring camera system.

FIG. 18 is a diagram illustrating a modification example of the monitoring camera system. In FIG. 18, the same configuration element as in FIG. 17 is denoted by the same reference numeral. The monitoring camera system in FIG. 18 includes a server 101. The server 101 is connected to the LAN 95 via, for example, a network 103 that is a public network such as the Internet and a gateway 102.

The server 101 has the same function as the server 61 described with reference to FIG. 12. The server 101 generates and stores a learning model based on image data of various monitoring cameras other than the monitoring cameras 91*a* to 91*d*. The terminal device 92 may access the server 101 to acquire learning data stored in the server 101 and set the learning data to the monitoring cameras 91*a* to 91*d*.

Fifth Embodiment

In a fifth embodiment, the monitoring camera 1 stores a plurality of learning models. Further, the monitoring camera 1 selects one of several learning models according to an instruction of the terminal device 2 and detects a detection target based on the selected learning model. Hereinafter, a different portion from the first embodiment will be described.

Figure 19:
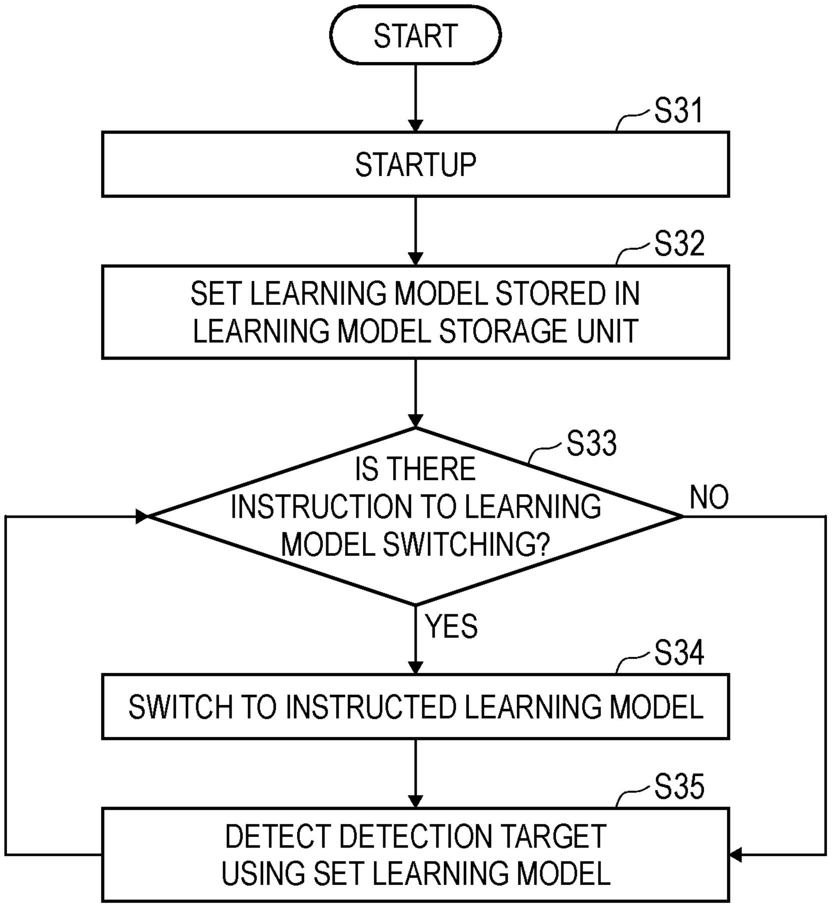
FIG. 19 is a flowchart illustrating an operation example of a monitoring camera according to a fifth embodiment.

FIG. 19 is a flowchart illustrating an operation example of the monitoring camera 1 according to the fifth embodiment. The learning model storage unit 17*c* of the monitoring camera 1 stores a plurality of learning models.

For example, the monitoring camera 1 starts up when the power is supplied (step S31).

The AI processing unit 17 of the monitoring camera 1 sets one learning model of the plurality of learning models stored in the learning model storage unit 17*c* to the AI arithmetic engine 17*a* (step S32).

The AI processing unit 17 of the monitoring camera 1 may set, for example, a learning model set at the time of previous startup among the plurality of learning models stored in the learning model storage unit 17*c* to the AI arithmetic engine 17*a*. Further, the AI processing unit 17 of the monitoring camera 1 may set, for example, a learning model initially set by the terminal device 2 among the plurality of learning models stored in the learning model storage unit 17*c* to the AI arithmetic engine 17*a*.

The AI processing unit 17 of the monitoring camera 1 determines whether or not there is an instruction to switch the learning model from the terminal device 2 (step S33).

When the AI processing unit 17 of the monitoring camera 1 determines that there is an instruction to switch the learning model ("Yes" in S33), the AI processing unit 17 of the monitoring camera 1 sets the learning model instructed from the terminal device 2 among the plurality of learning models stored in the learning model storage unit 17*c* to the AI arithmetic engine 17*a*. (step S34).

The AI arithmetic engine 17*a* detects a detection target front an image of the image data by using (forming a neural network according to the set learning model) the set learning model (step S35).

When it is determined in step S33 that there is no instruction to switch the learning model ("No" in S33), the AI arithmetic engine 17*a* of the monitoring camera 1 detects the detection target from the image of the image data by using the learning model previously set without switching the learning model (step S35).

Figure 20:
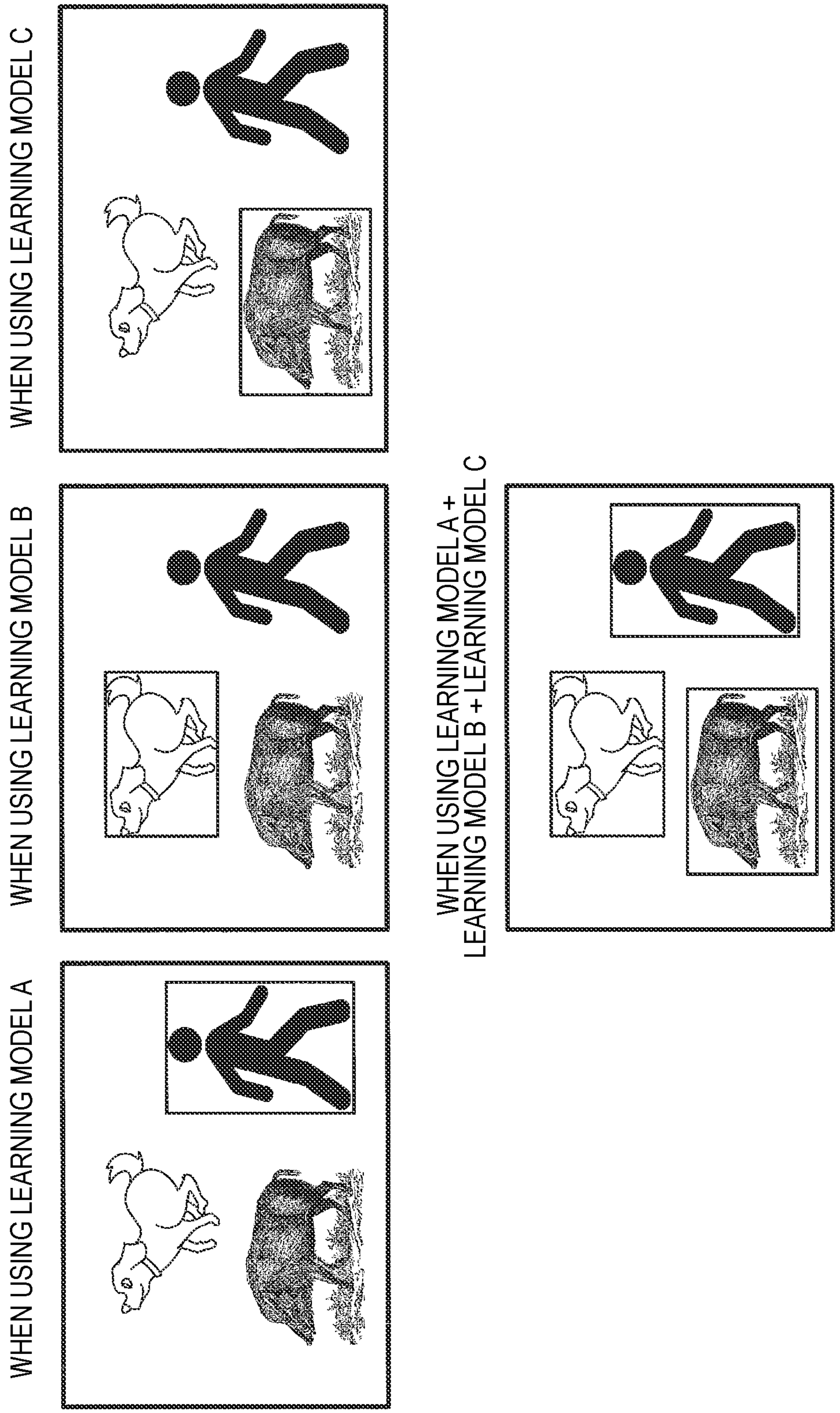
FIG. 20 is a diagram illustrating a detection example of a detection target by switching of the learning model.

FIG. 20 is a diagram illustrating an example of detecting a detection target by switching learning models. It is assumed that a learning model A, a learning model B, and a learning model C are stored in the learning model storage unit 17*c* of the monitoring camera 1. The learning model A is a learning model for detecting a man from an image output from the image processing unit 13. The learning model B is a learning model for detecting a dog from the image output from the image processing unit 13. The learning model C is a learning model for detecting a boar from the image output from the image processing unit 13.

The AI processing unit 17 receives a notification of instructing use of the learning model A from the terminal device 2. The AI processing unit 17 sets the learning model A stored in the learning model storage unit 17*c* to the AI arithmetic engine 17*a* according to the instruction from the terminal device 2. Thereby, the AI arithmetic engine 17*a* detects a man from the image output from the image processing unit 13, for example, as illustrated in "when using learning model A" in FIG. 20.

The AI processing unit 17 receives a notification of instructing use of the learning model B from the terminal device 2. The AI processing unit 17 sets the learning model B stored in the learning model storage unit 17*c* to the AI arithmetic engine 17*a* according to the instruction from the terminal device 2. Thereby, the AI arithmetic engine 17*a* detects a dog from the image output from the image processing unit 13, for example, as illustrated in "when using learning model B" in FIG. 20.

The AI processing unit 17 receives a notification of instructing use of the learning model C from the terminal device 2. The AI processing unit 17 sets the learning model C stored in the learning model storage unit 17*c* to the AI arithmetic engine 17*a* according to the instruction from the terminal device 2. Thereby, the AI arithmetic engine 17*a* detects a boar from the image output from the image processing unit 13, for example, as illustrated in "when using learning model C" in FIG. 20.

The AI processing unit 17 receives a notification of instructing use of the learning models A, B, and C from the terminal device 2. The AI processing unit 17 sets the learning models A, B, and C stored in the learning model storage unit 17*c* to the AI arithmetic engine 17*a* according to the instruction from the terminal device 2. Thereby, the AI arithmetic engine 17*a* detects the man, the dog, and the boar from the image output from the image processing unit 13, for example, as illustrated in "when using learning model A+learning model B+learning model C" in FIG. 20.

Figure 21:
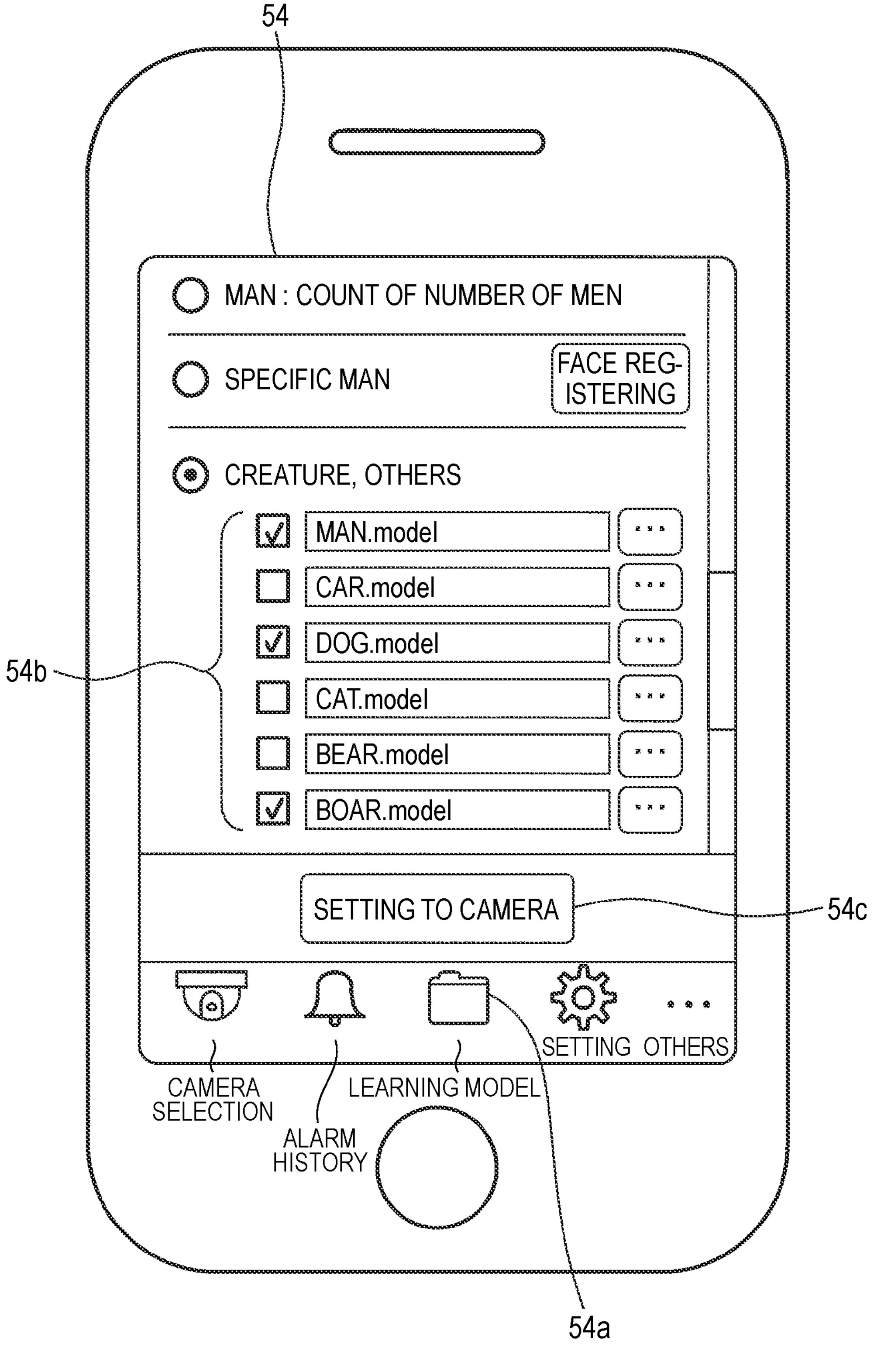
FIG. 21 is a diagram illustrating an example of setting the learning model.

FIG. 21 is a diagram illustrating an example of setting a learning model. In FIG. 21, the same configuration element as in FIG. 9 is denoted by the same reference numeral.

A user selects a learning model desired to be transmitted to the monitoring camera 1. For example, the user selects the learning model set to the monitoring camera 1 by selecting a check box displayed on a left side of the learning model 54*a*. In the example of FIG. 21, the user selects three learning models.

If the three learning models are selected, the user taps the button 54*c*. If the button 54*c* is tapped, the terminal device 2 transmits the three learning models selected by the user to the monitoring camera 1. If the monitoring camera 1 receives the three learning models, the monitoring camera 1 stores the received three learning models in the learning model storage unit 17*c*.

After transmitting the three learning models to the monitoring camera 1, the user instructs the monitoring camera 1 for the learning model set to the AI arithmetic engine 17*a*. The AI processing unit 17 of the monitoring camera 1 sets the learning model instructed from the terminal device 2 among the three learning models stored in the learning model storage unit 17*c* to the AI arithmetic engine 17*a*.

The terminal device 2 can add, change, or update the learning model stored in the learning model storage unit 17*c* according to an operation of the user. Further, the terminal device 2 can remove the learning model stored in the learning model storage unit 17*c* according to the operation of the user.

As such, the monitoring camera 1 may store a plurality of learning models. Then, the monitoring camera 1 may select one of several learning models according to the instruction of the terminal device 2 and form an AI based on the selected learning model. Thereby, the user can easily change a detection target of the monitoring camera 1.

Sixth Embodiment

In each of the above-described embodiments, an example in which a learning model is set from one still image captured by one monitoring camera 1 or image data is described. In a sixth embodiment, an example will be described in which the monitoring camera 1 generates a learning model from image data imaged by the monitoring camera 1, measurement data measured by one or more sensors provided in the monitoring camera 1, and voice data collected by the microphone 20. Specifically, the learning model according to the sixth embodiment is generated from at least one piece of time-series data or two or more pieces of data among the image data, measurement data, and voice data.

When the monitoring camera 1 includes each of a plurality of sensors and there are a plurality of pieces of measured measurement data, the learning model may be generated from each of the two pieces of measurement data. Furthermore, a sensor (not illustrated) described herein is a sensor provided in the monitoring camera 1, for example, a TOF sensor 19, a temperature sensor (not illustrated), a vibration sensor (not illustrated), a human sensor (not illustrated), A PTZ sensor (not illustrated), or the like.

Figure 22:
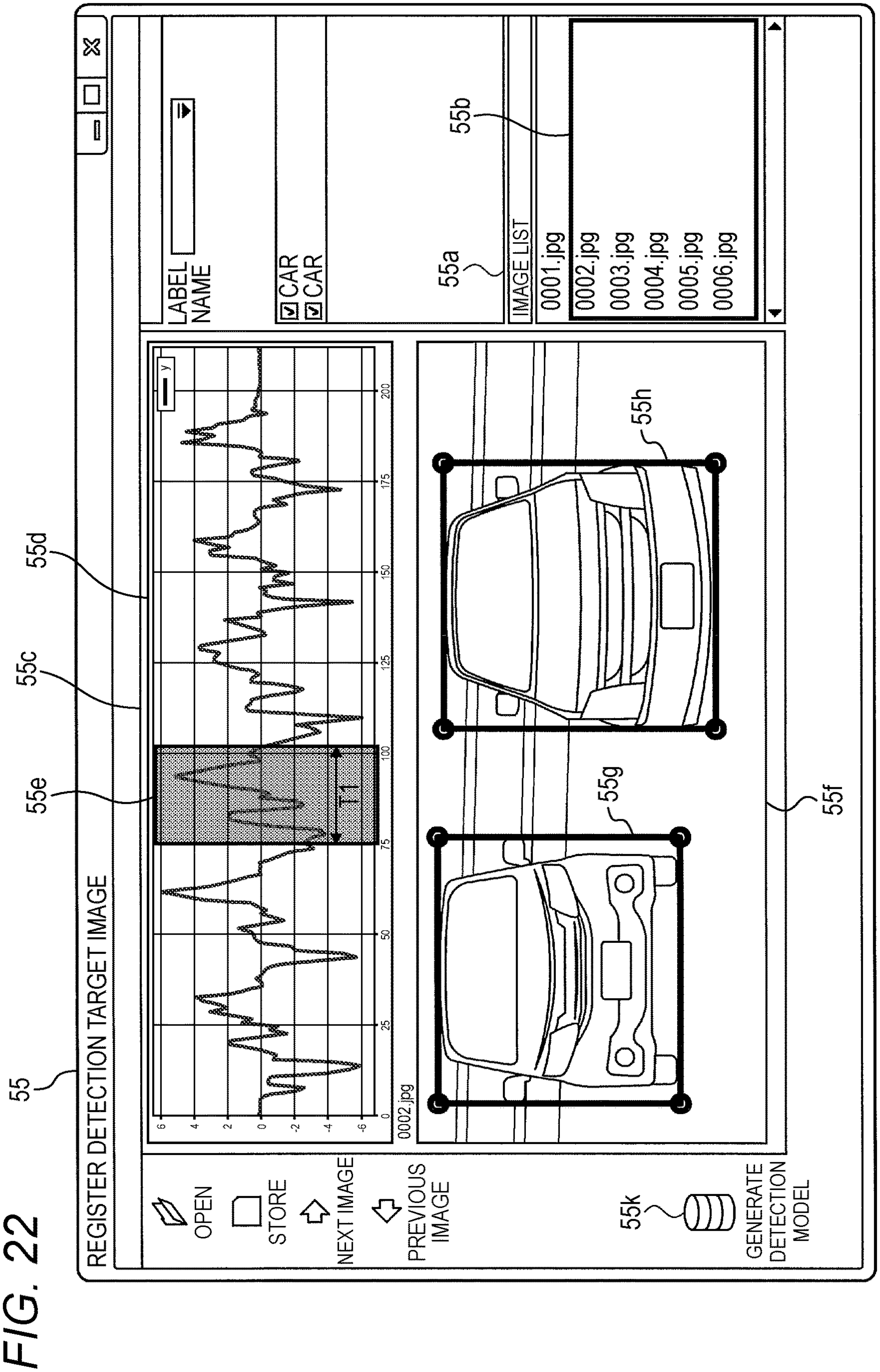
FIG. 22 is a diagram illustrating an example of generating a learning model according to a sixth embodiment.

FIG. 22 is a diagram illustrating an example of generating a learning model according to the sixth embodiment. A screen 55 illustrated in FIG. 22 is displayed on a display device of the terminal device 2.

The terminal device 2 (application for generating a learning model) displays at least one of the image data, measurement data, and voice data received from the monitoring camera 1 on a display device. The data which is displayed may be designated (selected) by a user. The user operates the terminal device 2 to select image data including an event of a detection target desired to be detected by the monitoring camera 1, measurement data, or voice data from the image data, measurement data, or voice data displayed on the display device of the terminal device 2. In the example illustrated in FIG. 22, the user selects each of a plurality of still images (that is, time-series image data) and time-series measurement data measured by a predetermined sensor.

The screen 55 of FIG. 22 displays a still image 55*f* which is one still image file configuring image data, and measurement data 55*d* measured by a predetermined sensor in a data display region 55*c* for displaying data for generating a learning model.

File names of a plurality of still images generated (selected) by a user from image data of the monitoring camera 1 are displayed in an image list 55*a* on the screen 55 in FIG. 22. In the example of FIG. 22, six of the plurality of still image files are generated, and five of the still image files are selected by the user.

If each of the plurality of still image files is selected from the image list 55*a* according to the operation of the user operation, the terminal device 2 displays at least one of images of the plurality of selected still image files on the display device of the terminal device 2. In FIG. 22, each of the plurality of selected still image files is displayed identifiably by being surrounded by a frame 55*b*, but a method for identifying and displaying the selected still image file is not limited to this, and for example, the selected still image file names may be displayed in different colors. The still image 55*f* illustrated in FIG. 22 indicates an image of a still image file "0002.jpg" selected by the user.

The user selects an event of a detection target desired to be detected by the monitoring camera 1 from the still image 55*f*. For example, it is assumed that the user wants to detect an automobile by using the monitoring camera 1. In this case, the user selects (marks) the automobile on the still image 55*f*. For example, the user operates the terminal device 2 to surround the respective automobiles by using the respective frames 55*g* and 55*h*.

Further, the terminal device 2 displays time-series measurement data 55*d* measured by a predetermined sensor (for example, a temperature sensor, a vibration sensor, a human sensor, an ultrasonic sensor, a PTZ drive sensor, or the like) according to an operation of a user. For example, the user marks a predetermined time zone on the measurement data 55*d*. For example, the user operates the terminal device 2 to mark a time zone T1 of the measurement data 55*d* by surrounding the time zone using the frame 55*e*. The time zone selected here is a predetermined period from the time when detection of the event of the detection target starts to the time when the detection ends.

When each of the plurality of still image files in the image list 55*a* is selected before the user marks the measurement data 55*d*, the terminal device 2 may determine that marking is made to a time zone corresponding to imaging time when each of the plurality of selected still image files is imaged. When it is determined that the marking is made, the terminal device 2 displays a frame in the time zone corresponding to the imaging time.

If the user marks data used for generating the learning model, the user clicks an icon 55*k* of "generate detection model". If the icon 55*k* is clicked, the terminal device 2 shifts to a screen for assigning a label to the marked image (images surrounded by the frames 55*g* and 55*h*) and measurement data (measurement data in the time zone T1 surrounded by the frame 55*e*). That is, the terminal device 2 shifts to a screen for teaching that the marked image (image data) and the measurement data are events (automobile running sound) of a detection target.

Figure 23:
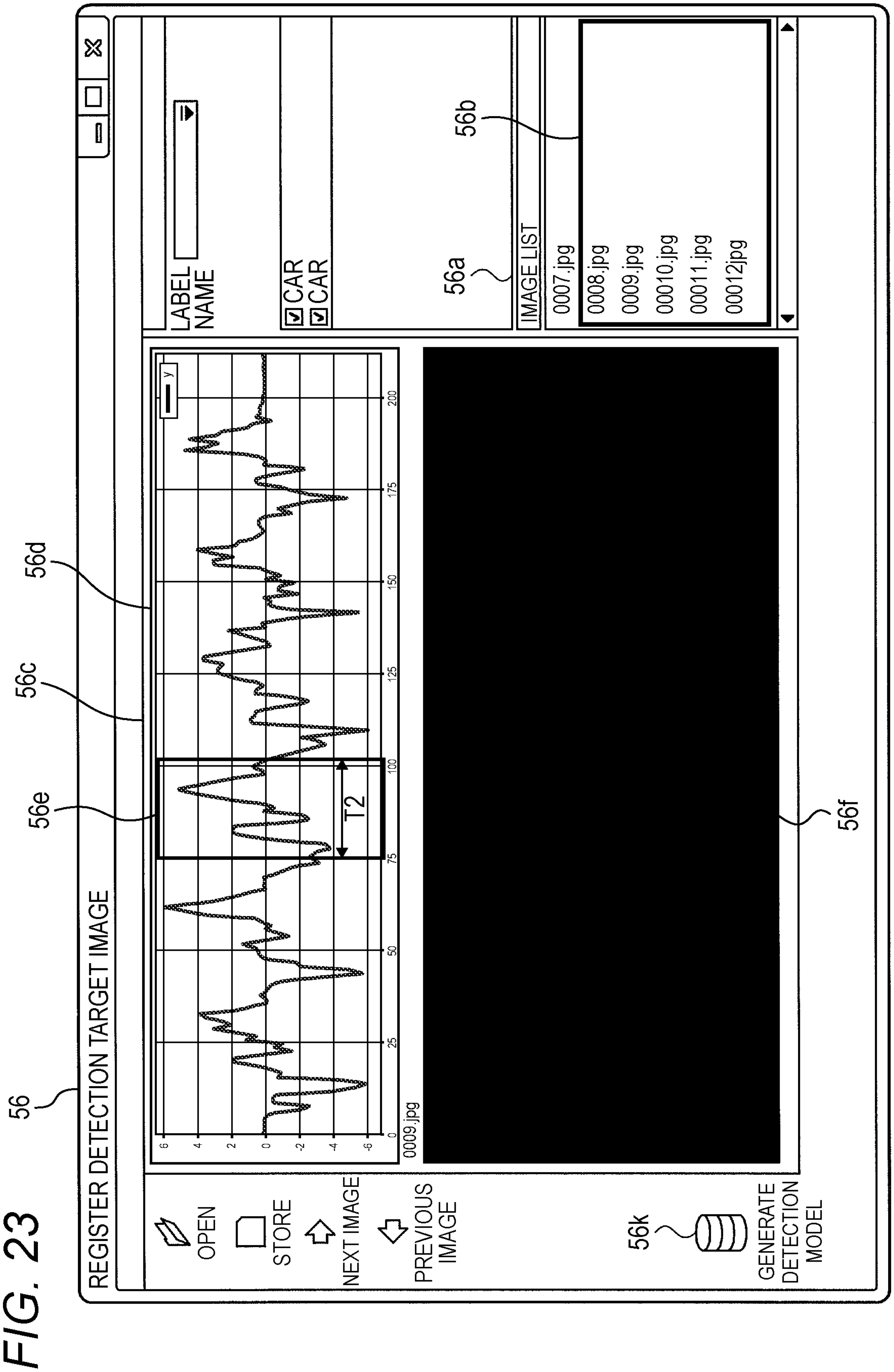
FIG. 23 is a diagram illustrating an example of generating the learning model according to the sixth embodiment.

FIG. 23 is a diagram illustrating an example of generating a learning model according to the sixth embodiment. A screen 56 illustrated in FIG. 23 is displayed on a display device of the terminal device 2. In the example illustrated in FIG. 23, a user selects each of a plurality of still images (that is, time-series image data) and time-series measurement data measured by a PTZ sensor.

In the screen 56 of FIG. 23, a still image 56*f* which is one still image file configuring image data, and measurement data 56*d* measured by a predetermined sensor are displayed in a data display region 56*c* for displaying data for generating a learning model.

File names of a plurality of still images generated (selected) from image data of the monitoring camera 1 by a user are displayed in an image list 56*a* of the screen 56 of FIG. 23. In the example of FIG. 23, six files "0007.jpg", "0008.jpg", "0009.jpg", "0010.jpg", "0011.jpg", and "0012.jpg" are generated among the plurality of still image files, and among these, five files "0008.jpg" to "0012.jpg" are selected by the user.

If each of the plurality of still image files is selected from the image list 56*a* according to an operation of the user, the terminal device 2 displays at least one of images of the plurality of selected still image files in the display device of the terminal device 2. In FIG. 23, each of the plurality of selected still image files is displayed identifiably by being surrounded by a frame 56*b*, but a method for identifying and displaying the selected still image file is not limited to this, and for example, the selected still image file names may be displayed in different colors. The still image 56*f* illustrated in FIG. 23 indicates an image of the still image file "0009.jpg" selected by the user.

The user selects an event of a detection target desired to be detected by the monitoring camera 1 from the still image 56*f*. The still image 56*f* illustrated in FIG. 23 is a black image captured in a state where the monitoring camera 1 fails or malfunctions. For example, it is assumed that the user wants to detect that the monitoring camera 1 is in an abnormal state such as failure or malfunction. In this case, the user selects (marks) the whole or a part of the still image 56*f* on the still image 56*f*. In such a case, as illustrated in FIG. 23, a frame indicating a marking range may be omitted.

Further, the terminal device 2 displays the time-series measurement data 56*d* measured by a PTZ sensor according to an operation of the user. For example, the user marks a predetermined time zone on the measurement data 56*d*. For example, the user operates the terminal device 2 to mark a time zone T2 of the measurement data 56*d* by surrounding the time zone with a frame 56*e*.

When each of the plurality of still image files in the image list 56*a* is selected before the measurement data 56*d* is marked by the user, the terminal device 2 may determine that marking is made to a time zone corresponding to imaging time when each of the plurality of selected still image files is imaged. When it is determined that the marking is made, the terminal device 2 displays a frame in a time zone corresponding to the imaging time.

If the user marks data used for generating a learning model, the user clicks an icon 56*k* of "generate detection model". If the icon 56*k* is clicked, the terminal device 2 shifts to a screen for assigning a label to the marked image (whole region of the still image 56*f*) and measurement data (measurement data in the time zone T2 surrounded by the frame 56*e*). That is, the terminal device 2 shifts to a screen for teaching that the marked image (image data) and the measurement data are events (black image detection) of a detection target.

Figure 24:
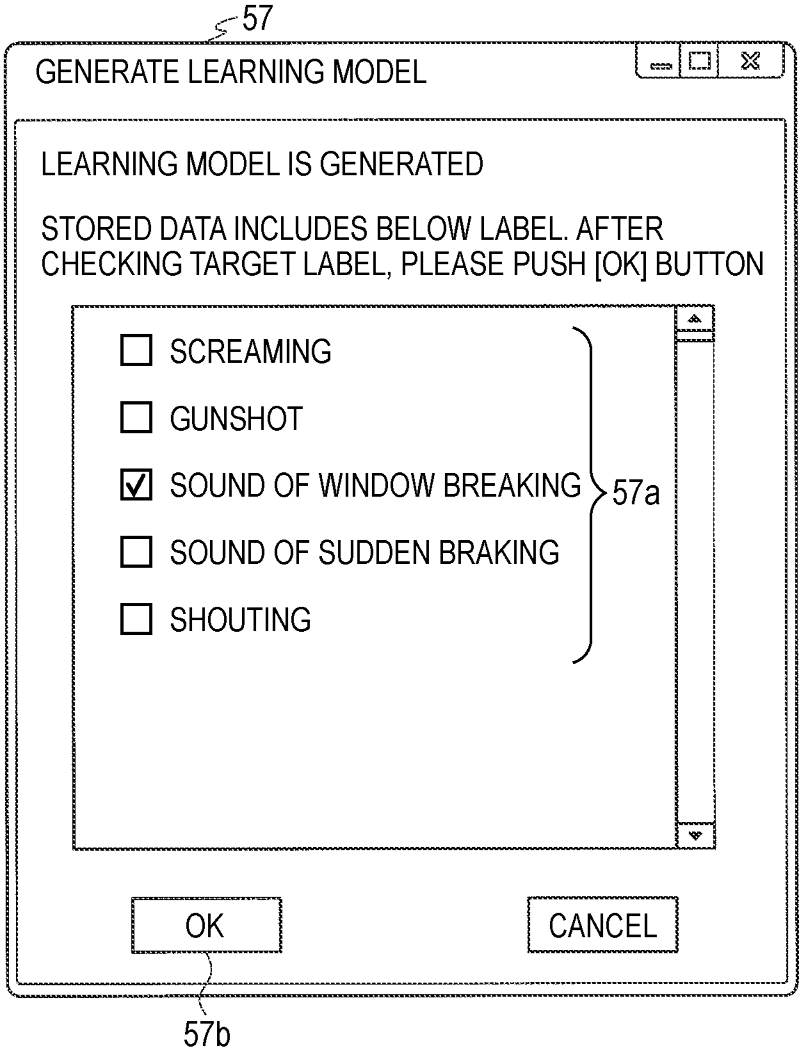
FIG. 24 is a diagram illustrating an example of generating the learning model.

FIG. 24 is a diagram illustrating an example of generating a learning model. A screen 57 illustrated in FIG. 24 is displayed on a display device of the terminal device 2. The screen 57 is displayed on the display device of the terminal device 2 when the icon "generate detection model" illustrated in FIGS. 22 and 23 is clicked.

A learning model illustrated in FIG. 24 is an example of generating the learning model that can detect, for example, "screaming", "gunshot", "sound of window breaking", "sound of sudden braking", and "shouting". These learning models are generated from, for example, time-series voice data or two pieces of data configured by voice data and image data. Data used for generating the learning model is not limited to this and may be, for example, measurement data measured by a vibration sensor, measurement data measured by a temperature sensor, or measurement data measured by a human sensor.

A label 57*a* including a plurality of labels "screaming", "gunshot", "sound of window breaking", "sound of sudden braking", and "shouting" is displayed on the screen 57. A user selects a check box displayed on a left side of the label 57*a* and assigns a label to an event of a detection target marked with time-series voice data or two pieces of data configured by voice data and image data.

The user marks "sound of window breaking" by using, for example, the time-series voice data or the two pieces of data configured by voice data and image data on the screen 57 illustrated in FIG. 24. Thus, the user selects the check box corresponding to the label 57*a* of "sound of window breaking" on the screen 57 in FIG. 24.

If the label "sound of window breaking" is selected, the user clicks a button 57*b*. If the button 57*b* is clicked, the terminal device 2 generates a learning model of the label "sound of window breaking" selected by the check box.

For example, if the button 57*b* is clicked, the terminal device 2 performs learning based on the marked data and the label. The terminal device 2 generates a parameter group for determining, for example, a structure of a neural network of the monitoring camera 1 by learning the marked data and the label. That is, the terminal device 2 generates a learning model for characterizing a function of an AI of the monitoring camera 1.

Figure 25:
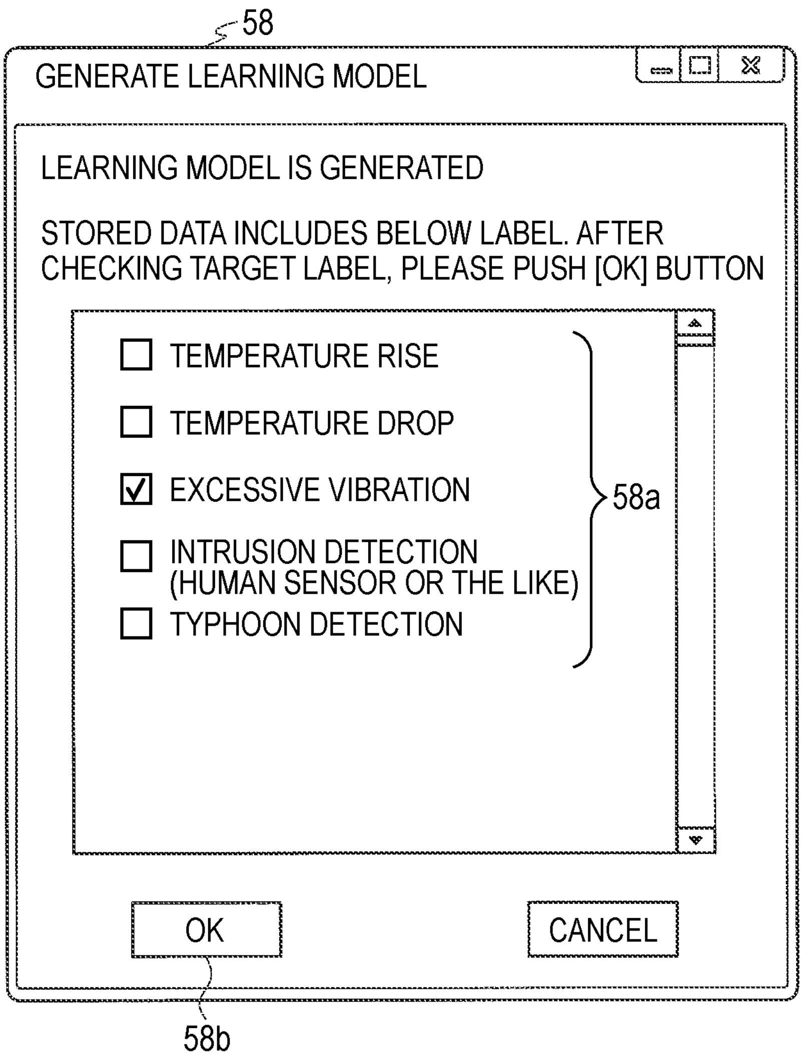
FIG. 25 is a diagram illustrating another example of generating the learning model.

FIG. 25 is a diagram illustrating another example of generating a learning model. A screen 58 illustrated in FIG. 25 is displayed on a display device of the terminal device 2. The screen 58 is displayed on the display device of the terminal device 2 if the icon "generate detection model" illustrated in FIGS. 22 and 23 is clicked.

The learning model illustrated in FIG. 25 is an example of generating the learning model that can detect, for example, "temperature rise", "temperature drop", "excessive vibration", "intrusion detection", and "typhoon detection". These learning models are generated from at least one time-series data of measurement data measured by sensors such as a temperature sensor, a vibration sensor, and a human sensor, image data, and voice data. The data used for generating the learning model is not limited to one, and each of a plurality of data selected by the user may be used for the data.

A label 58*a* including a plurality of labels "temperature rise", "temperature drop", "excessive vibration", "intrusion detection", and "typhoon detection" is displayed on the screen 58. The user selects the check box displayed on the left side of the label 58*a* and assigns a label to an event of a detection target marked with the data used for generating the learning model.

The user marks "excessive vibration" by using the marked data (for example, time-series vibration data, or time-series vibration data and voice data and the like) on the screen 58 illustrated in FIG. 25. Thus, the user selects the check box corresponding to the label 58*a* of "excessive vibration" on the screen 58 of FIG. 25.

If the label "excessive vibration" is selected, the user clicks a button 58*b*. If the button 58*b* is clicked, the terminal device 2 generates a learning model of the label "excessive vibration" in which the check box is selected.

For example, if the button 58*b* is clicked, the terminal device 2 performs learning based on the marked data and the label. The terminal device 2 generates a parameter group for determining, for example, a structure of a neural network of the monitoring camera 1 by learning the marked data and the label. That is, the terminal device 2 generates a learning model for characterizing a function of an AI of the monitoring camera 1.

Figure 26:
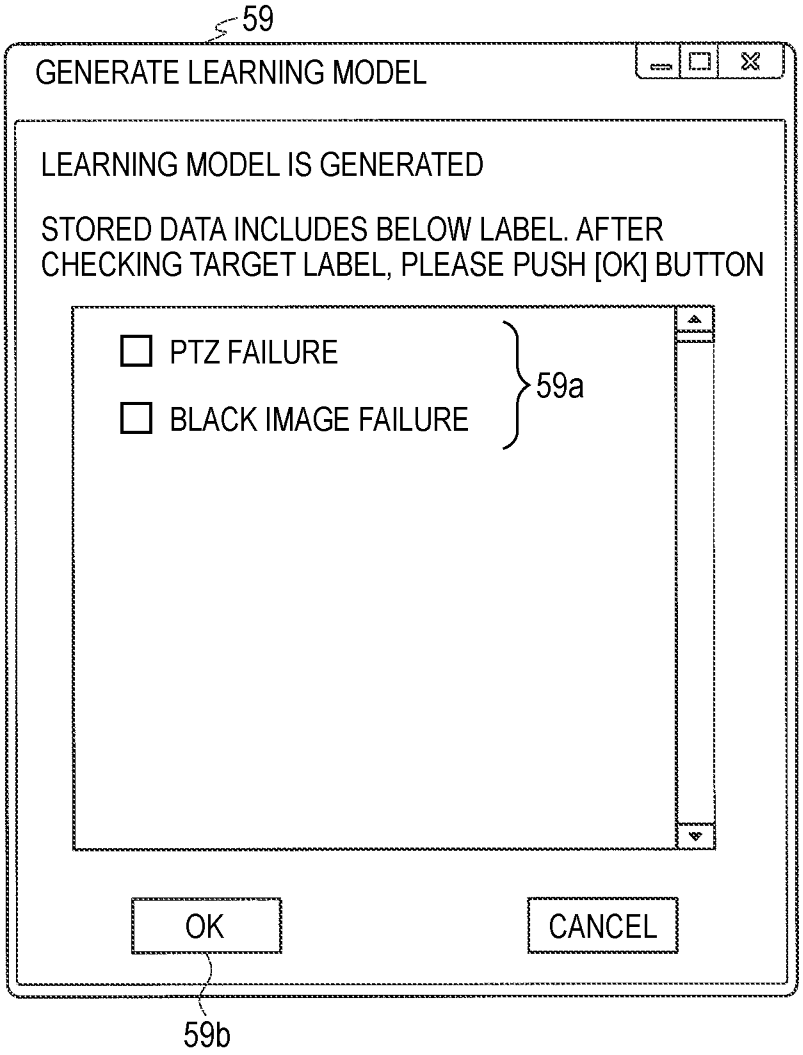
FIG. 26 is a diagram illustrating an example of setting the learning model.

FIG. 26 is a diagram illustrating an example of generating a learning model. A screen 59 illustrated in FIG. 26 is displayed on a display device of the terminal device 2. The screen 59 is displayed on the display device of the terminal device 2 if the icon "generate detection model" illustrated in FIGS. 22 and 23 is clicked.

The learning model illustrated in FIG. 26 is an example of generating the learning model capable of detecting, for example, "PTZ failure" and "black image failure". These learning models are generated from, for example, time-series measurement data measured by a PTZ sensor or image data. Data used for generating the learning model is not limited to one, and each of a plurality of data selected by the user may be used.

A label 59*a* including each of a plurality of labels "PTZ failure" and "black image failure" is displayed on the screen 59. A user selects a check box displayed on a left side of the label 59*a*, and assigns the label to an event of a detection target marked with data used for generating the learning model.

The user marks "black image failure" by using the marked data (for example, time-series vibration data, or time-series vibration data and voice data and the like) on the screen 59 illustrated in FIG. 26. Thus, the user selects a check box corresponding to the label 59*a* of "black image failure" on the screen 59 in FIG. 26.

If the label "black image failure" is selected, the user clicks the button 59*b*. If the button 59*b* is clicked, the terminal device 2 generates a learning model of the label "black image failure" in which the check box is selected.

For example, if the button 59*b* is clicked, the terminal device 2 performs learning based on the marked data and the label. The terminal device 2 generates a parameter group for determining, for example, a structure of a neural network of the monitoring camera 1 by learning the marked data and the label. That is, the terminal device 2 generates the learning model for characterizing a function of an AI of the monitoring camera 1.

Figure 27:
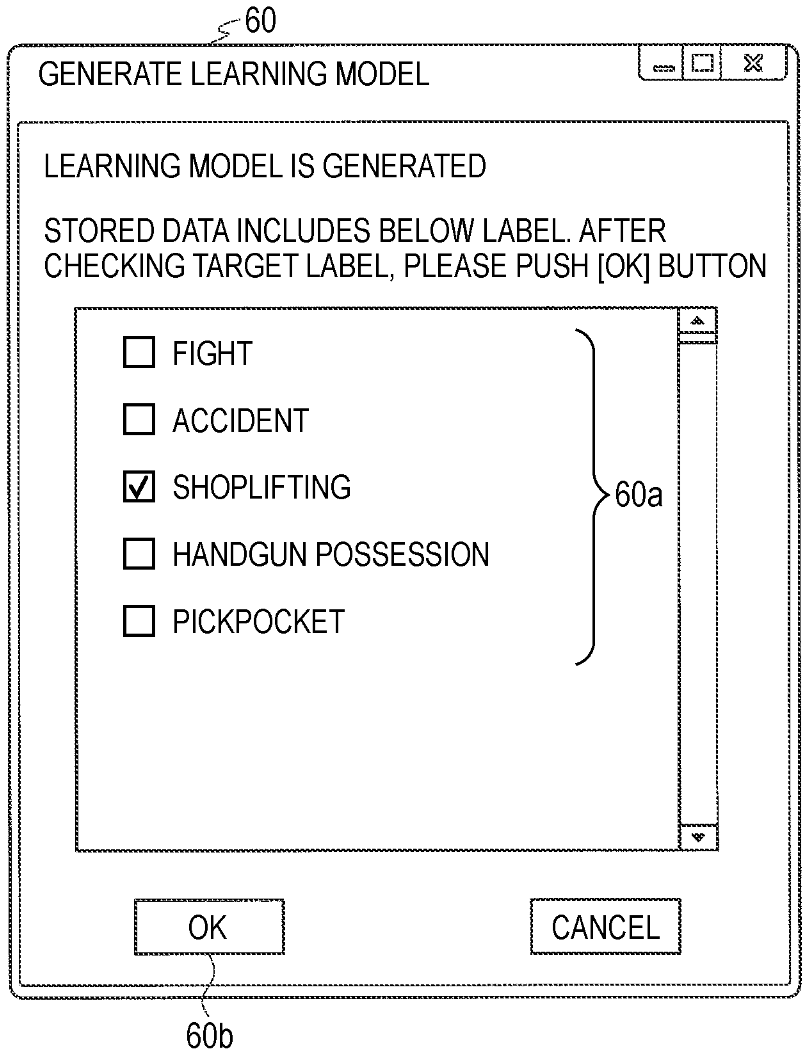
FIG. 27 is a diagram illustrating another example of setting the learning model.

FIG. 27 is a diagram illustrating another example of generating a learning model. A screen 60 illustrated in FIG. 27 is displayed on a display device of the terminal device 2. The screen 60 is displayed on the display device of the terminal device 2 if the icon "generate detection model" illustrated in FIGS. 22 and 23 is clicked.

The learning model illustrated in FIG. 27 is an example of generating the learning model that can detect, for example, "fight", "accident", "shoplifting", "handgun possession", and "pickpocket". These learning models are generated from at least one of time-series measurement data measured by sensors such as a temperature sensor, a vibration sensor, and a human sensor, image data, or voice data. The data used for generating the learning model is not limited to one, and each of a plurality of data selected by the user may be used.

A label 60*a* including each of a plurality of labels "fight", "accident", "shoplifting", "handgun possession", and "pickpocket" is displayed on the screen 60. A user selects a check box displayed on a left side of the label 60*a*, and assigns the label to an event of a detection target marked with data used for generating the learning model.

The user marks "shoplifting" by using the marked data (for example, time-series image data and voice data) on the screen 60 illustrated in FIG. 27. Thus, the user selects the check box corresponding to the label 60*a* of "shoplifting" on the screen 60 of FIG. 27.

If the label "shoplifting" is selected, the user clicks a button 60*b*. If the button 60*b* is clicked, the terminal device 2 generates a learning model for the label "shoplifting" in which the check box is selected.

For example, if the button 60*b* is clicked, the terminal device 2 performs learning based on the marked data and the label. The terminal device 2 generates a parameter group for determining, for example, a structure of a neural network of the monitoring camera 1 by learning the marked data and the label. That is, the terminal device 2 generates the learning model for characterizing a function of an AI of the monitoring camera 1.

Figure 28:
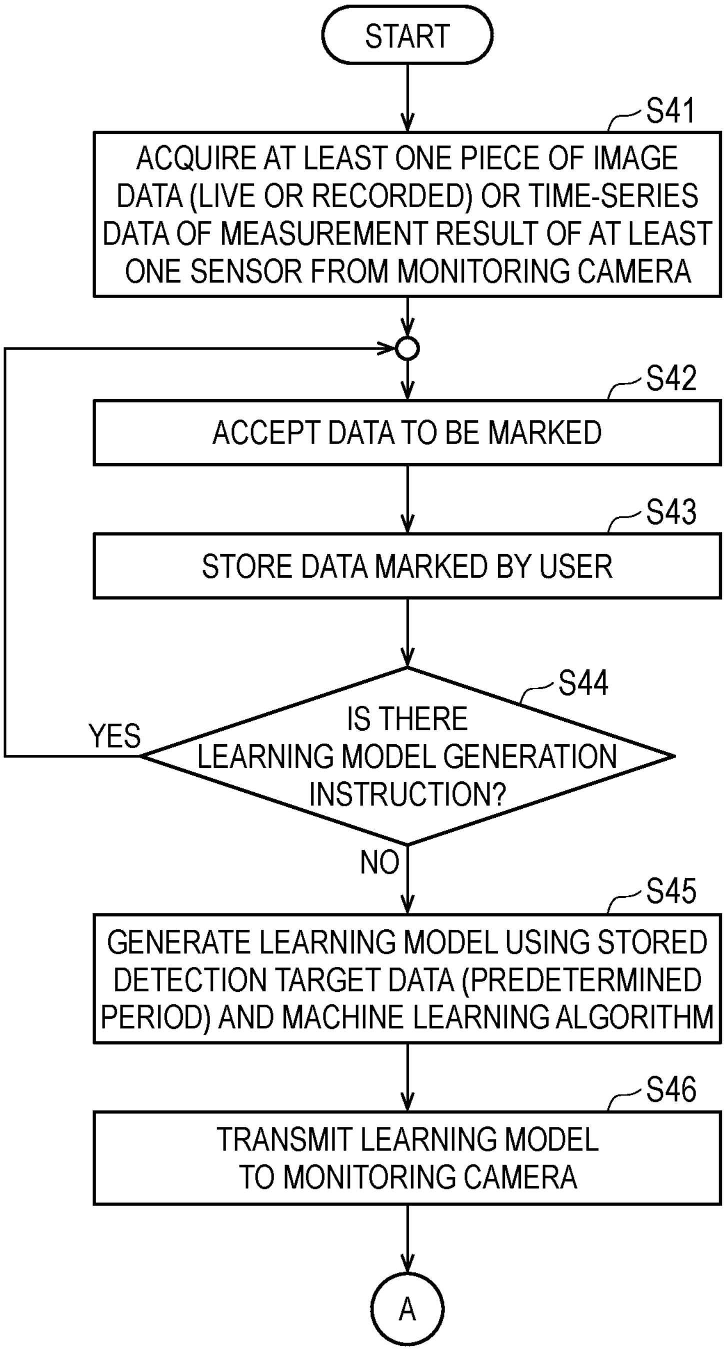
FIG. 28 illustrates an operation example of generating the learning model of a terminal device according to the sixth embodiment.
Figure 29:
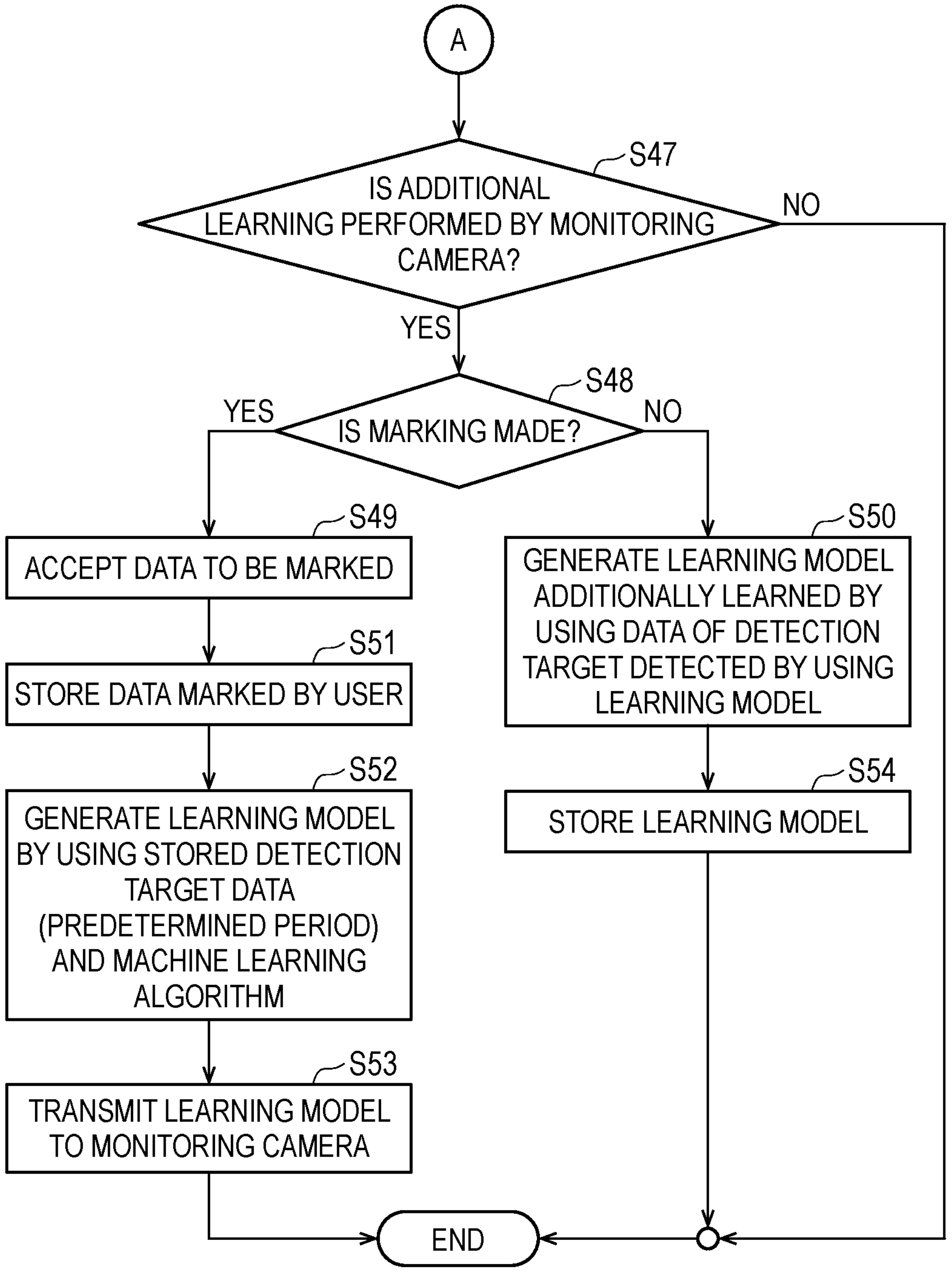
FIG. 29 is an operation example of additional learning of the learning model according to the sixth embodiment.

A learning model generation operation example according to the sixth embodiment will be described with reference to FIGS. 28 and 29. FIG. 28 is a flowchart illustrating a learning model generation operation example of the terminal device 2 according to the sixth embodiment. FIG. 29 is a flowchart illustrating an operation example of additional learning of the learning model according to the sixth embodiment.

The control unit 41 of the terminal device 2 acquires image data, voice data, or time-series measurement data (measurement results) measured by a plurality of sensors (for example, a temperature sensor, a vibration sensor, a human sensor, a PTZ sensor, and the like) from the monitoring camera 1 (step S41). The image data may be live data or recorded data. The control unit 41 of the terminal device 2 may acquire the image data of the monitoring camera 1 from a recorder that records an image of the monitoring camera 1.

A user operates the terminal device 2 to search for data including an event of a detection target from the image data of the monitoring camera 1, the voice data, or the measurement data measured by each of a plurality of sensors. In the sixth embodiment, the data to be searched for by the user is the image data, the voice data, or at least one piece of time-series data among the measurement data measured by each of a plurality of sensors, or at least two or more pieces of data (for example, image data and voice data, image data and measurement data, and two pieces of measurement data measured by other sensors).

The control unit 41 of the terminal device 2 accepts selection of data for marking the event of the detection target from the user (step S42). For example, the control unit 41 of the terminal device 2 accepts selection (that is, an operation for generating the frame 55*b*) of each of a plurality of still images that mark an event of a detection target from the image list 55*a* of FIG. 22.

The control unit 41 of the terminal device 2 accepts a marking operation for an event of a detection target from the user. For example, the control unit 41 of the terminal device 2 accepts the marking operation by using the frames 55*e*, 55*g*, and 55*h* illustrated in FIG. 22. The control unit 41 of the terminal device 2 stores data of a predetermined period (that is, time-series data) mailed by the user in the storage unit 46 (step S43).

The control unit 41 of the terminal device 2 determines whether or not there is a learning model generation instruction from the user (step S44). For example, the control unit 41 of the terminal device 2 determines whether or not an icon 51*k* in FIG. 22 is clicked. When it is determined that there is no learning model generation instruction from the user ("No" in S44), the control unit 41 of the terminal device 2 shifts the processing to step S42.

Meanwhile, when it is determined that there is the learning model generation instruction from the user ("Yes" in S44), the control unit 41 of the terminal device 2 accepts a labeling operation from the user (see FIGS. 24 to 27), Then, the control unit 41 of the terminal device 2 generates a learning model with the data (that is, time-series data) of a predetermined period stored in the storage unit 46, and a machine learning algorithm (step S45). The machine learning algorithm may be, for example, deep learning.

The control unit 41 of the terminal device 2 transmits the generated learning model to the monitoring camera 1 according to an operation of the user (Step S46).

The control unit 41 of the terminal device 2 determines whether or not there is an additional learning instruction for the learning model generated in step S46 from the user (step S47). When it is determined that there is no learning model generation instruction from the user ("No" in S47), the control unit 41 of the terminal device 2 ends the processing.

Meanwhile, when it is determined that there is an instruction to perform additional learning for the generated learning model ("Yes" in S47), the control unit 41 of the terminal device 2 further determines whether or not to perform additional learning of the learning model by using the data marked by the user from the user (step S48).

When it is determined that there is an instruction from the user to perform additional learning of the learning model by using the data marked by the user ("Yes" in S48), the control unit 41 of the terminal device 2 accepts the marking operation an event of the same detection target again (step S49). The data subject to the marking operation here may be different from the data in step S42. For example, the terminal device 2 accepts selection of each of a plurality of still images as data in which an event of a detection target is marked in step S42 but the data may be voice data in a predetermined time zone or measurement data in step S48.

Meanwhile, when it is determined that there is no instruction from the user to perform the additional learning of the learning model by using the data marked by the user ("No" in S48), the control unit 41 of the terminal device 2 transmits the instruction for additional learning of the generated learning model to the control unit 14 of the monitoring camera 1. The control unit 14 of the monitoring camera 1 performs additional learning by using data (image data, voice data, or time-series measurement data measured by each of a plurality of sensors (for example, a temperature sensor, a vibration sensor, a human sensor, a PTZ sensor, and the like)) of an event of a detection target detected by using the generated learning model according to the received instruction of the additional learning. The control unit 14 of the monitoring camera 1 generates a learning model based on the additional learning (step S50).

The control unit 41 of the terminal device 2 accepts a marking operation for the event of the detection target from the user. For example, the control unit 41 of the terminal device 2 accepts the marking operation by using the frames 55*e*, 55*g*, and 55*h* illustrated in FIG. 22. The control unit 41 of the terminal device 2 stores data (that is, time-series data) marked by the user for a predetermined period in the storage unit 46 (step S51).

The control unit 41 of the terminal device 2 generates a learning model in which additional learning is performed by using data (that is, time-series data) for the predetermined period stored in the storage unit 46 and a machine learning algorithm (step S52).

The control unit 41 of the terminal device 2 transmits the generated learning model to the monitoring camera 1 according to an operation of the user (step S53).

Further, the control unit 14 of the monitoring camera 1 stores the learning model generated by the additional learning in the storage unit 15 (step S54). At this time, the learning model may be overwritten by the learning model generated by additional learning and stored.

As described above, the monitoring camera 1 according to the sixth embodiment can be set so as to not only detect an event of a detection target by a single image but also detect events (movement, change, and the like) of the detection target by using time-series data or a combination of a plurality of data. That is, the learning model according to the sixth embodiment can simultaneously detect the selection of each of a plurality of detection targets and the events (movement, change, and the like) of the selected detection target. For example, a man, a dog, and a boar are detected from an image output from the image processing unit 13, and an action of a detection target can be set to "when using learning model A+learning model B+learning model C" illustrated in FIG. 20 as an event of the detection target. Thereby, for example, in the example illustrated in FIG. 20, the monitoring camera 1 can simultaneously detect that a man is "going to fight", a dog is "running", and a boar is "going to stop". Thus, the user can simultaneously set a detection target desired to be detected and an event of the detection target.

Figure 30:
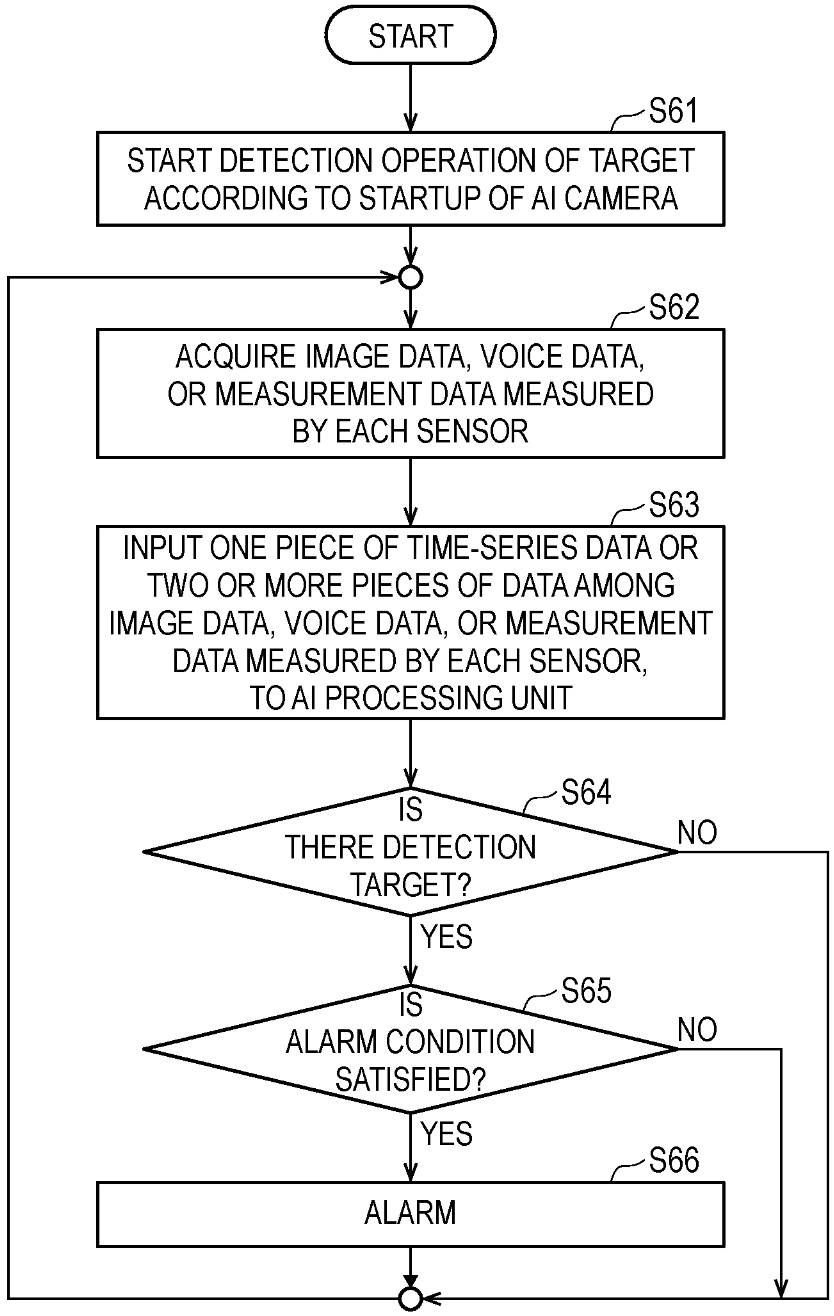
FIG. 30 is a flowchart illustrating an operation example of the monitoring camera according to the sixth embodiment.

FIG. 30 is a flowchart illustrating an operation example of the monitoring camera 1.

The AI processing unit 17 of the monitoring camera 1 starts a detection operation of an event of a detection target according to startup of the monitoring camera 1 (step S61). For example, the AI processing unit 17 of the monitoring camera 1 forms a neural network based on a learning model transmitted from the terminal device 2 and starts the detection operation of the event of the detection target.

The monitoring camera 1 images an image and collects a voice by using the microphone 20, and further, performs each measurement by using each sensor provided therein. The monitoring camera 1 acquires the imaged image data, the collected voice data, or each of a plurality of measured measurement data (step S62).

The control unit 14 of the monitoring camera 1 inputs at least one piece of time-series data or two or more pieces of data among the data (image data, collected voice data, or each of a plurality of pieces of measured measurement data) acquired in step S62 to the AI processing unit 17 (step S63). When the number of pieces of data input here is one, the time-series data may be input, and when the number is two or more, data in a predetermined time may be input instead of the time-series data.

The AI processing unit 17 of the monitoring camera 1 determines whether or not an event of a detection target is included in the data input in step S63 (step S64).

When it is determined in step S64 that the input data does not include the event of the detection target ("No" in S64), the control unit 14 of the monitoring camera 1 shifts the processing to step S62.

Meanwhile, when it is determined in step S14 that the input data includes the event of the detection target ("Yes" in S64), the control unit 14 of the monitoring camera 1 determines whether or not an alarm condition is satisfied (step S65).

The alarm condition includes, for example, detection of "sound of window breaking" as illustrated in FIG. 24. For example, if the AI processing unit 17 detects a sound (voice data) that breaks a window, an image (image data) that breaks a window, or the like, the control unit 14 of the monitoring camera 1 may determine that the alarm condition is satisfied.

Further, the alarm condition includes detection of "excessive vibration", for example, as illustrated in FIG. 25. For example, if the AI processing unit 17 detects vibration data (measurement data) exceeding a predetermined vibration amount or vibration time, or an image (image data) in which surroundings of the monitoring camera 1 shake more than a predetermined time, the control unit 14 of the monitoring camera 1 may determine that the alarm condition is satisfied.

Further, the alarm condition includes detection of "black image failure", for example, as illustrated in FIG. 26. For example, if it is detected that an image captured by the AI processing unit 17 is in a black image state (that is, a state of being unreflected) for a predetermined time or longer, the control unit 14 of the monitoring camera 1 may determine that the alarm condition is satisfied.

Further, the alarm condition includes action detection of "shoplifting", for example, as illustrated in FIG. 27. For example, if it is detected that a man reflected in the image captured by the AI processing unit 17 puts a product in a bag or a rucksack or a voice that conveys shoplifting with a voice of a specific man is detected, the control unit 14 of the monitoring camera 1 may determine that the alarm condition is satisfied.

When it is determined in step S65 that the alarm condition is not satisfied ("No" in S66), the control unit 14 of the monitoring camera 1 shifts the processing to step S62.

Meanwhile, when it is determined in step S65 that the alarm condition is satisfied ("Yes" in S65), for example, the control unit 14 of the monitoring camera 1 emits a sound or the like by using the alarm device 3 (step S66) and repeats subsequent steps S62 to S66.

As described above, the monitoring camera 1 according to the sixth embodiment can perform additional learning for the generated learning model M1 or acquire a learning model additionally learned from the terminal device 2. Thereby, the monitoring camera 1 can improve a detection accuracy of an event of a detection target that the user wants to detect.

As described above, the monitoring camera 1 according to the sixth embodiment is the monitoring camera 1 including artificial intelligence, and includes a sound collection unit, the communication unit 18 that receives a parameter for teaching an event of a detection target, and a processing unit that constructs artificial intelligence based on a parameter and detects an event of a detection target from voices collected by the sound collection unit by using the constructed artificial intelligence.

Thereby, the monitoring camera 1 according to the sixth embodiment can construct artificial intelligence that can be flexibly set to a monitoring camera among events of a detection target that a user wants to detect, and can detect the event of the detection target among voices collected by a sound collection unit.

As described above, the monitoring camera 1 according to the sixth embodiment is a monitoring camera 1 having artificial intelligence and includes at least one sensor, the communication unit 18 that receives a parameter for teaching an event of a detection target, and a processing unit that constructs the artificial intelligence based on the parameter and detects the event of the detection target from measurement data measured by the sensor by using the constructed artificial intelligence.

Thereby, the monitoring camera 1 according to the sixth embodiment can construct artificial intelligence that can be set flexibly in a monitoring camera for detecting an event of a detection target which can be detected by measurement data measured by a sensor among the events of the detection target that a user wants to detect.

Further, a parameter of the monitoring camera 1 according to the sixth embodiment is generated by using a voice collected by a sound collection unit. Thereby, the monitoring camera 1 according to the sixth embodiment can detect an event of a detection target that can be detected by the voice collected by the sound collection unit among the events of the detection target that a user wants to detect.

Further, a parameter of the monitoring camera 1 according to the sixth embodiment is generated by using measurement data measured by a sensor. Thereby, the monitoring camera 1 according to the sixth embodiment can detect and construct an event of a detection target that can be detected by the measurement data measured by at least one sensor among events of the detection target that a user wants to detect.

Further, the monitoring camera 1 according to the sixth embodiment further includes an imaging unit, and the processing unit detects an event of a detection target from an image captured by the imaging unit. Thereby, the monitoring camera 1 according to the sixth embodiment can further detect the event of the detection target that the user wants to detect by using the image.

Further, the monitoring camera 1 according to the sixth embodiment further includes a control unit (for example, the AI processing unit 17) that determines whether or not an alarm condition is satisfied based on the detection result of the event of the detection target and outputs a notification sound from the alarm device 3 when the alarm sound is satisfied. Thereby, the monitoring camera 1 according to the sixth embodiment can output the notification sound which notifies of detection of the event of the detection target from the alarm device 3, when the event of the detection target set by a user is detected.

Further, the monitoring camera 1 according to the sixth embodiment further includes a control unit (for example, the AI processing unit 17) that determines whether or not an alarm condition is satisfied based on the detection result of the event of the detection target and outputs alarm information from the terminal device 2 when the alarm condition is satisfied. Thereby, the monitoring camera 1 according to the sixth embodiment can make the terminal device 2 output the alarm information for notifying of the detection of the event of the detection target when the event of the detection target set by a user is detected.

Further, in the monitoring camera 1 according to the sixth embodiment, a communication unit receives each of a plurality of different parameters, and a processing unit constructs artificial intelligence based on at least two designated parameters among the plurality of different parameters. Thereby, the artificial intelligence constructed in the sixth embodiment can estimate occurrence of the event of the detection target that the user wants to detect and can improve a detection accuracy.

Further, a communication unit of the monitoring camera 1 according to the sixth embodiment receives each of a plurality of different parameters, and a processing unit constructs artificial intelligence based on a parameter in a designated predetermined time zone among each of the plurality of different parameters. Thereby, the artificial intelligence constructed in the sixth embodiment can estimate occurrence of an event of a detection target that a user wants to detect and can improve a detection accuracy.

Further, the monitoring camera 1 according to the sixth embodiment further includes an interface unit that receives a parameter from the external storage medium 31 that stores the parameter. Thereby, the monitoring camera 1 according to the sixth embodiment can construct artificial intelligence by using image data collected by another monitoring camera, voice data, or measurement data.

Each functional block used in the description of the above-described embodiments is typically realized as an LSI which is an integrated circuit. These may be individually configured by one chip or may be configured by one chip so as to include a part or the whole thereof. Here, it is called an LSI, hut may also be called an IC, a system LSI, a super LSI, or an ultra LSI depending on a degree of integration.

Further, a method of integrating a circuit is not limited to the LSI and may be realized by a dedicated circuit or a general-purpose processor. After manufacturing the LSI, a programmable field programmable gate array (FPGA) or a reconfigurable processor that can reconfigure connection and setting of circuit cells in the LSI may be used.

Furthermore, if an integrated circuit technology of replacing the LSI by using another technology advanced or derived from a semiconductor technology comes out, integration of a functional block using the technology may be performed. Biotechnology can be applied. Further, respective embodiments may be combined.

As described above, while various embodiments are described with reference to the drawings, it goes without saying that the present disclosure is not limited to the examples. It is apparent that those skilled in the art can implement various change examples, modification examples, substitution examples, addition examples, removal examples, and equivalent examples within the scope of claims, and it is also understood that those belong to the technical scope of the present disclosure. Further, the respective configuration elements of the above-described various embodiments may be randomly combined with each other in the range that does not depart from the gist of the present disclosure.

The present disclosure is useful as a monitoring camera including an AI that can flexibly set a detection target that a user wants to detect to a monitoring camera, and a detection method.

The present application is based upon Japanese Patent Application (Patent Application No. 2019-005279 filed on Jan. 16, 2019 and Patent Application No. 2019-164739 filed on Sep. 10, 2019), the contents of which are in incorporated herein by reference.

What is claimed is:

1. A monitoring camera, comprising:
a capturing unit;
a memory configured to store a plurality of different learning models relating to a detection target, each learning model of the plurality of different learning models respectively corresponding to a different detection target type, wherein the memory is further configured to store a user-designated learning model from the plurality of different learning models; and
a processor configured to implement an artificial intelligence based on a learning model selected among the plurality of different learning models and to detect the detection target from a captured image by the capturing unit based on the artificial intelligence.

2. The monitoring camera according to claim 1,
wherein the processor, in response to a designation from a terminal device,
selects the learning model among the plurality of different learning models from the memory, and
implements the artificial intelligence based on the selected learning model.

3. The monitoring camera according to claim 1,
wherein the processor implements the artificial intelligence based on a learning model set at the time of previous startup among the plurality of different learning models stored in the memory.

4. The monitoring camera according to claim 1, wherein the processor implements the artificial intelligence based on a learning model initially set among the plurality of different learning models stored in the memory.

5. The monitoring camera according to claim 1, further comprising:

an interface configured to receive the learning model from an external storage medium storing the learning model.

6. The monitoring camera according to claim 5, wherein the external storage medium is a USB memory.

7. A monitoring camera system, comprising:

a monitoring camera; and a server computer communicably connected the monitoring camera, wherein the server computer stores a plurality of different learning models relating to a detection target which is detected by the monitoring camera, each learning model of the plurality of different learning models respectively corresponding to a different detection target type, wherein the monitoring camera has a capturing unit; and a processor configured to implement an artificial intelligence based on a learning model received from the server computer and to detect the detection target from a captured image by the capturing unit based on the artificial intelligence, and wherein the monitoring camera is configured to accept a user-designated learning model from the plurality of different learning models stored in the server computer.

8. A detection method, comprising:

selecting a user-designated learning model from a memory storing a plurality of different learning models relating to a detection target, each learning model of the plurality of different learning models respectively corresponding to a different detection target type;

implementing an artificial intelligence based on the selected learning model; and detecting the detection target from a captured image by a capturing unit based on the artificial intelligence.

* * * * *